US012812355B2

(12) United States Patent
Li et al.

(10) Patent No.: US 12,812,355 B2
(45) Date of Patent: Nov. 24, 2026

(54) METHOD FOR CONTROLLING TERMINAL DEVICE TO ACCESS NETWORK, AND COMMUNICATION APPARATUS AND SYSTEM

(71) Applicant: HUAWEI TECHNOLOGIES CO., LTD., Shenzhen (CN)

(72) Inventors: Yongcui Li, Beijing (CN); Hui Ni, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 347 days.

(21) Appl. No.: 18/363,868

(22) Filed: Aug. 2, 2023

(65) Prior Publication Data

US 2023/0379689 A1 Nov. 23, 2023

Related U.S. Application Data

(63) Continuation of application No. PCT/CN2021/092716, filed on May 10, 2021.

(30) Foreign Application Priority Data

Feb. 3, 2021 (WO) ................ PCT/CN2021/075114

(51) Int. Cl.

| | |
|---|---|
| ***H04W 8/12*** | (2009.01) |
| ***H04W 60/04*** | (2009.01) |
| ***H04W 60/06*** | (2009.01) |
| *H04W 84/06* | (2009.01) |

(52) U.S. Cl.

CPC ............ *H04W 8/12* (2013.01); *H04W 60/04* (2013.01); *H04W 60/06* (2013.01); *H04W 84/06* (2013.01)

(58) Field of Classification Search

None

See application file for complete search history.

(56) References Cited

U.S. PATENT DOCUMENTS

| | | | | |
|---|---|---|---|---|
| 2012/0281566 | A1* | 11/2012 | Pelletier | H04W 76/27 370/252 |
| 2017/0171909 | A1* | 6/2017 | Lau | H04L 67/306 |
| 2019/0223066 | A1* | 7/2019 | Xu | H04W 36/0058 |
| 2019/0254089 | A1* | 8/2019 | Huang-Fu | H04W 36/0016 |

(Continued)

FOREIGN PATENT DOCUMENTS

| | | | |
|---|---|---|---|
| CN | 101626623 | A | 1/2010 |
| CN | 101848449 | A | 9/2010 |
| CN | 101854678 | A | 10/2010 |

OTHER PUBLICATIONS

3GPP TSG-SA WG2 Meeting #140E S2-2008309,"Network selection for NR satellite access",Nokia,Nokia Shanghai Bel, Elbonia,Aug. 19-Sep. 1, 2020,total 2 pages.

(Continued)

*Primary Examiner* — Christopher T Wyllie

(74) *Attorney, Agent, or Firm* — HAUPTMAN HAM, LLP

(57) ABSTRACT

A method for controlling a terminal device to access a network includes receiving, by a mobility management network element, identification information of the network from an access network device, and sending, by the mobility management network element, information indicating to the terminal device not to initiate a service in response to failing to determine whether the terminal device is allowed to access the network.

13 Claims, 8 Drawing Sheets

(56) References Cited

U.S. PATENT DOCUMENTS

| | | | | |
|---|---|---|---|---|
| 2020/0389830 | A1* | 12/2020 | Park | H04W 60/04 |
| 2021/0136658 | A1* | 5/2021 | Rönneke | H04W 48/06 |
| 2021/0360569 | A1* | 11/2021 | Park | H04W 60/06 |
| 2021/0377720 | A1* | 12/2021 | Wang | H04W 8/08 |
| 2022/0116908 | A1* | 4/2022 | Chun | H04W 24/08 |
| 2022/0141700 | A1* | 5/2022 | Hedman | H04L 67/14 370/230 |
| 2022/0377613 | A1* | 11/2022 | Watfa | H04W 28/0908 |
| 2022/0418020 | A1* | 12/2022 | Adjakple | H04W 8/183 |
| 2023/0039877 | A1* | 2/2023 | Suh | H04W 76/18 |
| 2023/0199691 | A1* | 6/2023 | Lu | H04W 48/18 455/435.2 |
| 2023/0292399 | A1* | 9/2023 | Velev | H04W 76/36 |
| 2023/0379689 | A1* | 11/2023 | Li | H04W 60/04 |

OTHER PUBLICATIONS

3GPP TS 23.122 V17.1.1 (Jan. 2021),3rd Generation Partnership Project;Technical Specification Group Core Network and Terminals;Non-Access-Stratum (NAS) functions related to Mobile Station (MS) in idle mode (Release 17),total 88 pages.

3GPP TS 38.305 V16.1.0 (Jul. 2020),3rd Generation Partnership Project;Technical Specification Group Radio Access Network;NG Radio Access Network (NG-RAN);Stage 2 functional specification of User Equipment (UE) positioning in NG-RAN (Release 16),total 114 pages.

3GPP TS 23.501 V16.7.0 (Dec. 2020),3rd Generation Partnership Project;Technical Specification Group Services and System Aspects-;System architecture for the 5G System (5GS);Stage 2 (Release 16),total 442 pages.

3GPP TS 23.502 V16.7.1 (Jan. 2021),3rd Generation Partnership Project;Technical Specification Group Services and System Aspects;Procedures for the 5G System (5GS);Stage 2 (Release 16),total 597 pages.

3GPP TR 23.737 V17.1.0, 3rd Generation Partnership Project, Technical Specification Group Services and System Aspects, Study on architecture aspects for using satellite access in 5G, Release 17, Jul. 2020, total 92 pages.

3GPP TSG-SA WG2 Meeting #142E, 3GPP Draft, 23.502, v16.6.0, S2-2009484, "Network selection for NR satellite access", Nokia, Nokia Shanghai Bell, Nov. 2020, total 31 pages.

Extended European Search Report issued in corresponding European Application No. 21924025.6, dated Jun. 5, 2024, pp. 1-14.

Chinese First Office Action issued in corresponding Chinese Application No. 202180092427.7, dated Jul. 11, 2026, pp. 1-40.

* cited by examiner

METHOD FOR CONTROLLING TERMINAL DEVICE TO ACCESS NETWORK, AND COMMUNICATION APPARATUS AND SYSTEM

CROSS-REFERENCE TO RELATED APPLICATIONS

This application is a continuation of International Application No. PCT/CN2021/092716, filed on May 10, 2021, which claims priority to International Application No. PCT/CN2021/075114, filed on Feb. 3, 2021, the disclosures of the aforementioned applications are hereby incorporated by reference in their entireties.

TECHNICAL FIELD

This application relates to the field of wireless communication, and more specifically, to a method for controlling a terminal device to access a network, and a communication apparatus and system.

BACKGROUND

Communication satellites cover a large area and cross countries. In some approaches, user equipment (user equipment, UE) is located in a country B, and a satellite signal received by the UE crosses a country. For example, the UE receives a public land mobile network (public land mobile network, PLMN)-A broadcast signal and a PLMN-B broadcast signal of a satellite. According to regulatory requirements, the UE needs to access a core network corresponding to a current location, that is, a 5G core network corresponding to the country B, that is, 5GC-B in the figure.

However, cases in which the regulatory requirements are not met currently exist.

SUMMARY

One or more embodiments of the present application provide a method for controlling a terminal device to access a network, to prevent the terminal device from initiating a service before whether the terminal device is allowed to access the network is verified, so that compliance with regulatory requirements is ensured.

According to a first aspect, this application provides a method for controlling a terminal device to access a network. The method includes: A mobility management network element receives identification information of the network from an access network device. When it is not determined whether the terminal device is allowed to access the network, the mobility management network element sends, to the terminal device, information indicating not to initiate a service.

According to the method, when the mobility management network element does not determine whether the terminal device is allowed to access the network, the mobility management network element indicates the terminal device not to initiate a service, for example, not to initiate a session establishment process or not to perform data transmission. In this way, the terminal device is prevented from initiating a service before whether the terminal device is allowed to access the network is verified, and compliance with regulatory requirements is ensured.

In some embodiments, the mobility management network element determines that the terminal device accesses the network through a satellite. In this manner, the mobility management network element needs to determine that a type of network access of the terminal device is satellite access, and then indicates the terminal device not to initiate a service.

In some embodiments, the mobility management network element sends a first message to the terminal device, where the first message includes the information indicating not to initiate a service.

In some embodiments, the first message is a registration accept message. In this manner, the mobility management network element sends, to the terminal device via the registration accept message, the information indicating not to initiate a service, so that signaling is reduced.

In some embodiments, the first message is a response message of a session establishment request. In this manner, the mobility management network element sends, to the terminal device via the response message of the session establishment request, the information indicating not to initiate the service, so that signaling is reduced.

In some embodiments, the information indicating not to initiate a service indicates that whether the terminal device is allowed to access the network is not verified.

In some embodiments, the first message further includes a timer 1, where the timer 1 indicates that deregistration is to be initiated after the timer 1 expires.

In some embodiments, the first message further includes a timer 2, and the timer 2 indicates that initiation of a service is to be allowed after the timer 2 expires. In this manner, the mobility management network element provides the timer 2 for the terminal device. In this way, when determining that the terminal device is allowed to access the network, the mobility management network element does not need to indicate that the terminal device is allowed to initiate a service, so that signaling is reduced.

In some embodiments, the mobility management network element determines that the terminal device is allowed to access the network. The mobility management network element sends, to the terminal device, information indicating that initiation of a service is allowed, where the information indicating that initiation of a service is allowed indicates that the initiation of the service is allowed. In this manner, when determining that the terminal device is allowed to access the network, the mobility management network element indicates that the terminal device is allowed to initiate the service.

In some embodiments, the mobility management network element determines that the terminal device is not allowed to access the network. The mobility management network element sends, to the terminal device, information indicating that accessing the network is not allowed, where the information indicating that accessing the network is not allowed indicates that accessing the network is not allowed. In this manner, when determining that the terminal device is not allowed to access the network, the mobility management network element indicates that the terminal device is not allowed to access the network, so that the terminal device is deregistered from the network.

In some embodiments, the information indicating that accessing the network is not allowed is a deregistration request message.

In some embodiments, a case in which it is not determined whether the terminal device is allowed to access the network includes: The mobility management network element does not obtain a location of the terminal device; or precision of a location of the terminal device that is obtained by the mobility management network element is insufficient to determine whether to allow the terminal device to access the network.

According to a second aspect, this application provides a method for controlling a terminal device to access a network. The method includes: The terminal device sends identification information of the network to a mobility management network element of the network. The terminal device receives, from the mobility management network element, information indicating not to initiate a service.

According to the method, the terminal device provides the identification information of the network for the mobility management network element. Then, when a core network does not determine whether the terminal device is allowed to access the network, the terminal device receives, from the mobility management network element, the information indicating not to initiate a service, and further does not initiate the service. For example, the terminal device does not initiate a session establishment process or does not perform data transmission. In this way, the terminal device is prevented from initiating a service before whether the terminal device is allowed to access the network is verified, and compliance with regulatory requirements is ensured.

In some embodiments, the terminal device receives a first message from the mobility management network element, where the first message includes the information indicating not to initiate a service.

In some embodiments, the first message is a registration accept message. In this manner, the terminal device receives, from the mobility management network element via the registration accept message, the information indicating not to initiate a service, so that signaling is reduced.

In some embodiments, the first message is a response message of a session establishment request. In this manner, the terminal device receives, from the mobility management network element via the response message of the session establishment request, the information indicating not to initiate a service, so that signaling is reduced.

In some embodiments, the information indicating not to initiate a service indicates that whether the terminal device is allowed to access the network is not verified.

In some embodiments, the first message further includes a timer 1, where the timer 1 indicates that deregistration is to be initiated after the timer 1 expires.

In some embodiments, the first message further includes a timer 2, and the timer 2 indicates that initiation of a service is to be allowed after the timer 2 expires. In this manner, the mobility management network element provides the timer 2 for the terminal device. In this way, when the core network determines to allow the terminal device to access the network, the terminal device does not need to receive information indicating that initiation of a service is allowed, so that signaling is reduced.

In some embodiments, the terminal device receives, from the mobility management network element, information indicating that initiation of a service is allowed, and the second message indicates that the initiation of the service is allowed. In this manner, if the core network determines that the terminal device is allowed to access the network, the terminal device receives the information indicating that initiation of a service is allowed.

In some embodiments, the terminal device receives, from the mobility management network element, information indicating that accessing the network is not allowed, where the information indicating that accessing the network is not allowed indicates that accessing the network is not allowed. In this manner, if the mobility management network element determines that the terminal device is not allowed to access the network, the terminal device receives the information indicating that accessing the network is not allowed, and then the terminal device is deregistered from the network.

In some embodiments, the information indicating that accessing the network is not allowed is a deregistration request message.

According to a third aspect, this application provides a method for controlling a terminal device to access a network. The method includes: The terminal device accesses the network. The terminal device initiates a service after preset duration expires.

According to the method, the terminal device accesses the network, and initiates the service after the preset duration expires. In this way, the terminal device is prevented from initiating a service before the core network verifies whether the terminal device is allowed to access the network, so that compliance with regulatory requirements is ensured.

In some embodiments, the terminal device accesses the network through a satellite.

In some embodiments, the preset duration is greater than duration in which the core network verifies access of the terminal device to the network. In this manner, the compliance with the regulatory requirements is further ensured by setting a value of the preset duration.

According to a fourth aspect, this application provides a method for controlling a terminal device to access a network. The method includes: A mobility management network element receives identification information of the network from an access network device. When it is not determined whether the terminal device is allowed to access the network, the mobility management network element sends information 4 to a session management network element, where the information 4 indicates to generate a rule for caching a packet of the terminal device.

According to the method, when the mobility management network element does not determine whether the terminal device is allowed to access the network, the mobility management network element indicates the session management network element to generate the rule for caching the packet of the terminal device. Then, the session management network element provides the rule for a user plane network element, and the user plane network element caches the packet according to the rule, to avoid packet transmission before whether the terminal device is allowed to access the network is verified, so that compliance with regulatory requirements is ensured.

In some embodiments, the mobility management network element determines that the terminal device accesses the network through a satellite. In this manner, the mobility management network element needs to determine that a type of network access of the terminal device is satellite access, and further indicates the session management network element to generate the rule for caching the terminal device.

In some embodiments, the mobility management network element sends a second message to the session management network element, where the second message includes information 4 and a timer 3, where the timer 3 indicates that a session release process is to be initiated after the timer 3 expires.

In some embodiments, the mobility management network element sends a second message to the session management network element, where the second message includes information 4 and a timer 4, where the timer 4 indicates that the rule is to be updated after the timer 4 expires, and an updated rule indicates to transmit a packet of the terminal device. In this manner, the mobility management network element provides, via a message, the session management network element with the information 4 and the timer 4 indicating that the rule is to be updated after the timer expires. In this way, the mobility management network element does not need to indicate to update the rule after determining that the terminal device is allowed to access the network. The session management network element or the user plane network element directly updates the rule based on the timer 4, so that signaling is reduced.

In some embodiments, the mobility management network element determines that the terminal device is allowed to access the network. The mobility management network element sends information 5 to the session management network element, where the information 5 indicates to update the rule, and an updated rule indicates to transmit a packet of the terminal device. In this manner, if determining that the terminal device is allowed to access the network, the mobility management network element indicates the session management network element to update the rule to transmit the packet of the terminal device. Then, the session management network element provides the updated rule for the user plane network element, and the user plane network element transmits the packet according to the updated rule.

In some embodiments, the mobility management network element determines that the terminal device is not allowed to access the network.

The mobility management network element initiates a deregistration process.

According to a fifth aspect, this application provides a mobility management network element. The mobility management network element has a function for implementing the method in the first aspect or the fourth aspect. The function may be implemented by hardware, or may be implemented by hardware executing corresponding software. The hardware or the software includes one or more modules corresponding to the function.

According to a sixth aspect, this application provides a terminal device. The terminal device has a function for implementing the method in the second aspect or the third aspect. The function may be implemented by hardware, or may be implemented by hardware executing corresponding software. The hardware or the software includes one or more modules corresponding to the function.

In some embodiments, the terminal device includes a chip.

According to a seventh aspect, this application provides a communication apparatus. The communication apparatus includes a processor, and may perform any one or more methods in the first aspect to the fourth aspect.

In some embodiments, the communication apparatus further includes a memory, configured to store necessary program instructions and data.

In some embodiments, the communication apparatus further includes a transceiver, configured to communicate between the communication apparatus and another apparatus.

In some embodiments, the communication apparatus may be a chip system.

According to an eighth aspect, this application provides a computer program product. When the computer program product runs on a computer, the computer is enabled to perform any one or more methods in the first aspect to the fourth aspect.

According to a ninth aspect, this application provides a computer-readable storage medium. The computer-readable storage medium stores instructions. When the instructions are run on a computer, the computer is enabled to perform any one or more methods in the first aspect to the fourth aspect.

According to a tenth aspect, this application provides a communication system. The system includes the mobility management network element in the first aspect and the access network device in the first aspect. In some embodiments, the system further includes the terminal device in the second aspect.

According to an eleventh aspect, this application provides a communication system. The system includes the mobility management network element in the fourth aspect and the session management network element in the fourth aspect. In some embodiments, the system further includes the user plane network element or the access network device in the fourth aspect.

DETAILED DESCRIPTION

To make objectives, technical solutions, and advantages of embodiments of this application clearer, the following further describes embodiments of this application in detail with reference to the accompanying drawings.

In the descriptions of this application, unless otherwise specified, "a plurality of" means two or more. At least one of the following items (pieces) or a similar expression thereof refers to any combination of these items, including any combination of singular items (pieces) or plural items (pieces). For example, at least one of a, b, or c may represent: a, b, c, a-b, a-c, b-c, or a-b-c, where a, b, and c may be one or more. The words “example” or “for example” indicate examples, illustrations, or descriptions. Any embodiment or design solution described as “example” or “for example” in embodiments of this application should not be interpreted as being more preferred or advantageous than another embodiment or design solution. Specifically, the use of the words “example”, “for example”, or the like is intended to present the related concepts in a concrete manner for ease of understanding.

In addition, a network architecture and a service scenario described in embodiments of this application are used to describe the technical solutions in embodiments of this application more clearly, but do not constitute a limitation on the technical solutions in embodiments of this application. A person of ordinary skill in the art may know that with evolution of the network architecture and emergence of a new service scenario, the technical solutions in embodiments of this application are also applicable to similar technical problems.

Figure 2:
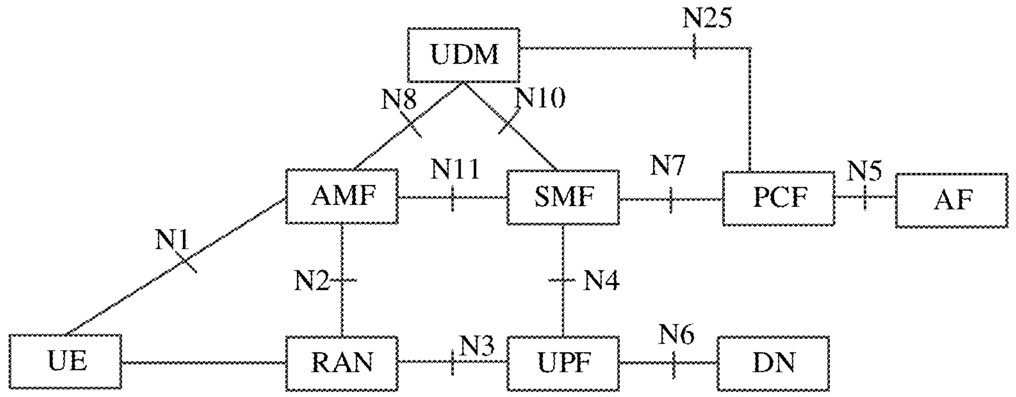
FIG. 2 is a schematic diagram of an architecture of a communication system according to an embodiment of this application.

Refer to FIG. 2. FIG. 2 is a 5G (5th generation mobile network, 5G) system framework to which this application is applicable. The 5G system architecture mainly includes the following logical network elements: a radio access network (radio access network, RAN), an access and mobility management function (access and mobility management function, AMF) network element, a session management function (session management function, SMF) network element, a user plane function (user plane function, UPF) network element, a policy control function (policy control function, PCF) network element, and a unified data management function (unified data management, UDM) network element.

The AMF is responsible for mobility management on a mobile network, for example, functions such as user location update, user network registration, and user switching. The SMF is mainly responsible for session management on a mobile network, for example, functions such as session establishment, session modification, and session release. The UPF is mainly responsible for assigning an internet protocol (internet protocol, IP) address to a user and providing a packet forwarding function. The PCF is responsible for providing policies for the AMF and the SMF, for example, providing a quality of service policy and a slice selection policy. The UDM is responsible for storing subscriber data, for example, subscription information, authorization information, and authentication information. An application function (application function, AF) is responsible for providing a service to a 3rd generation partnership project (3rd generation partnership project, 3GPP) network, for example, affecting service routing and interacting with a PCF to perform policy control. A network data analytics function (network data analytics function, NWDAF) is responsible for providing network analysis information to a network element of a network function (network function, NF) such as an AMF, an SMF, and a PCF, and the NWDAF notifies the subscribed NF of the network analysis information. Alternatively, the NF may directly obtain specific network analysis information from the NWDAF. A data network (data network, DN) may be an operator network that provides a data transmission service for a user, for example, an IP multimedia service (IP multimedia service, IP multimedia service) and the Internet. The terminal may be a terminal device such as a mobile phone or an internet of things terminal. The terminal accesses the DN by establishing a session from the terminal to a RAN, a UPF, and a DN.

Figure 3:
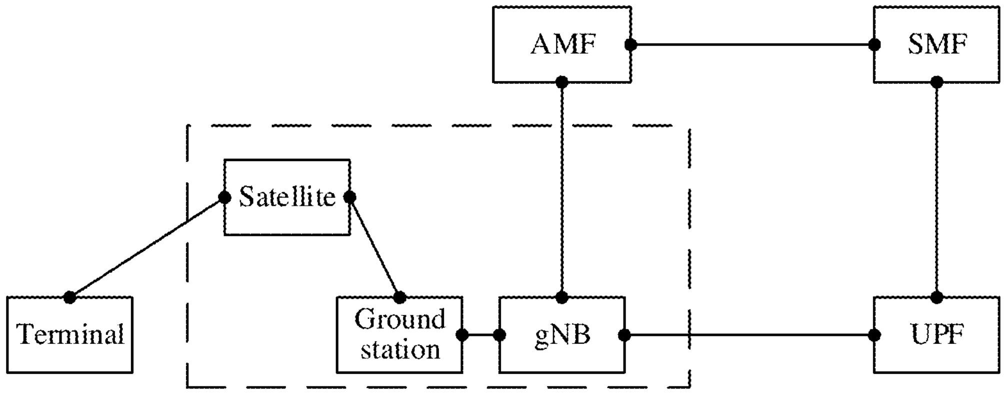
FIG. 3 is a schematic diagram of another architecture of a communication system according to an embodiment of this application.

The RAN is an access network device that provides network access for a terminal. In the field of satellite communication, a RAN may provide a satellite access device for a terminal, and division is performed based on functions of satellites. The RAN may include a satellite, a ground station, and a next generation NodeB (next generation NodeB, gNB). In one case, referring to FIG. 3, as a radio remote unit, a satellite mainly performs intermediate frequency processing on signals, for example, I/Q modulation and demodulation, up/down conversion, and analog-to-digital conversion. A satellite may also perform radio frequency processing on signals and implement duplexing. This satellite communication mode is referred to as transparent satellite enabled NR-RAN (transparent satellite enabled NR-RAN). In another case, referring to FIG. 4, a satellite may be used as a gNB, and this satellite transmission mode is referred to as a regenerative satellite enabled NR-RAN (regenerative satellite enabled NR-RAN) mode. It should be noted that, in the regenerative satellite enabled NR-RAN, the satellite may also be used as a gNB data unit (gNB data unit, gNB-DU). In the regenerative satellite enabled NR-RAN, the satellite has on-board processing capability.

The functions of each interface are as follows: N1: an interface between the AMF and user equipment (user equipment, UE), which is independent of access, and is configured to transfer a QoS control rule to the UE, and the like; N2: an interface between the AMF and the RAN, configured to transfer radio bearer control information and the like from a core network side to the RAN; N3: an interface between the RAN and the UPF, configured to transfer user plane data between the RAN and the UPF; N4: an interface between the SMF and the UPF, configured to transfer information between the control plane and the user plane, including delivery of forwarding rules, QoS control rules, and traffic statistics rules from the control plane to the user plane, and reporting of user-plane information. N5: an interface between the AF and PCF, configured to deliver application service requests and report network events. N6: an interface between the UPF and the DN, configured to transfer user plane data between the UPF and the DN; N7: an interface between the PCF and the SMF, configured to deliver a protocol data unit (protocol data unit, PDU) session granularity and a service data flow granularity control policy; N8: an interface between the AMF and the UDM, used by the AMF to obtain access and mobility management-related subscription data and authentication data from the UDM, and the AMF to register current mobility management-related information of the UE with the UDM, and the like; N10: an interface between the SMF and the UDM, used by the SMF to obtain session management-related subscription data from the UDM, and the SMF to register information related to a current session of the UE with the UDM, and the like; N11: an interface between the SMF and the AMF, configured to transfer PDU session tunnel information between the RAN and the UPF, control messages sent to the UE, radio resource control information sent to the RAN, and the like.

The terminal device in embodiments of this application, referred to as a terminal for short, is a device configured to implement a wireless communication function, and may be deployed on land, including an indoor device or an outdoor device, a handheld device, or a vehicle-mounted device. It can also be deployed on the water surface (such as a ship). It can also be deployed in the air (for example, on aircraft, balloons and satellites). The terminal may be UE, an access terminal, a terminal unit, a terminal station, a mobile station, a mobile station, a remote station, a remote terminal, a mobile device, a wireless communication device, a terminal agent, and the like in a 5G network or a future evolved public land mobile network (public land mobile network, PLMN). The terminal may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device or another processing device connected to a wireless modem, a vehicle-mounted device or a wearable device, an unmanned aerial vehicle (unmanned aerial vehicle, UAV) and an unmanned aerial vehicle controller (UAV controller, UAVC), a virtual reality (virtual reality, VR) terminal device, an augmented reality (augmented reality, AR) terminal device, a wireless terminal in industrial control (industrial control), a wireless terminal in self-driving (self-driving), a wireless terminal in remote medical (remote medical), a wireless terminal in smart grid (smart grid), a wireless terminal in transportation safety (transportation safety), a wireless terminal in a smart city (smart city), a wireless terminal in a smart home (smart home), and the like. The terminal may be mobile or fixed.

In addition, the AMF may be the mobility management network element in embodiments of this application. In addition to an AMF in a 5G system, the mobility management network element in embodiments of this application may be a network element with a mobility management function in a future network. Correspondingly, a session management network element in embodiments of this application may be an SMF in a 5G system, or may be a network element with a session management function in a future network. A user plane network element in embodiments of this application may be a UPF in a 5G system, or may be a network element used for user plane data transmission in a future network.

In addition, a related function of the terminal device, the mobility management network element, the session management network element, or the user plane network element in embodiments of this application may be implemented by one device, a plurality of devices, a chip in a device, or one or more function modules in a device. This is not specifically limited in embodiments of this application. It may be understood that the foregoing function may be a network element in a hardware device, may be a software function running on dedicated hardware, a combination of hardware and software, or a virtualization function instantiated on a platform (for example, a cloud platform).

Figure 5:
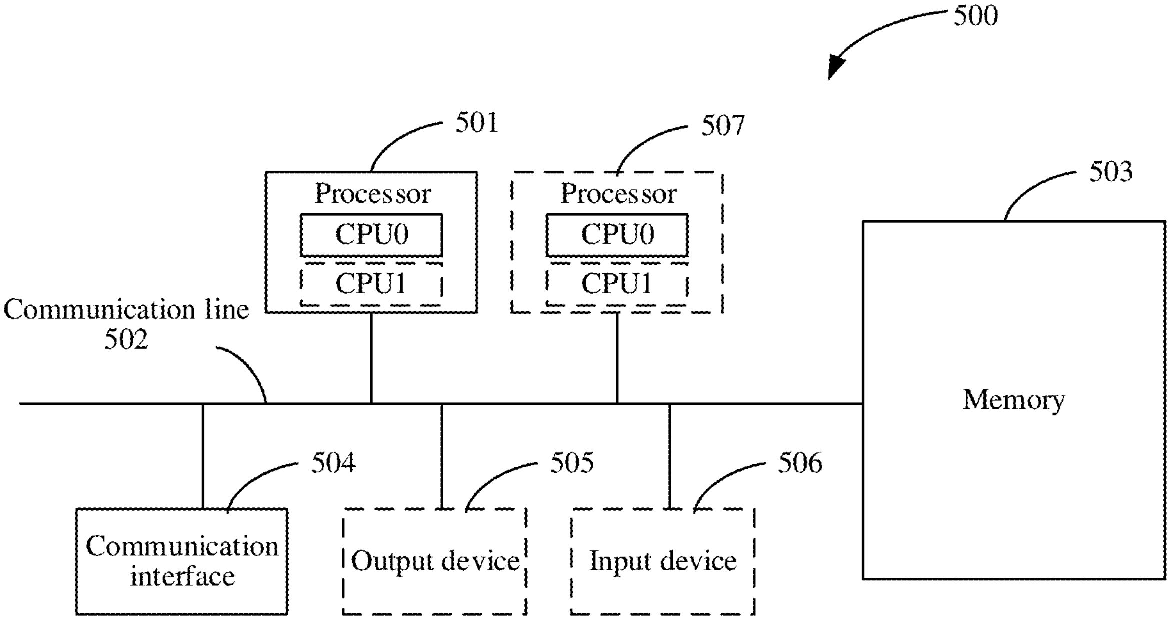
FIG. 5 is a schematic diagram of a communication device 500 according to an embodiment of this application.

For example, a related function of the terminal device, the mobility management network element, the session management network element, or the user plane network element in embodiments of this application may be implemented by using a communication device 500 in FIG. 5. FIG. 5 is a schematic diagram of a structure of a communication device 500 according to an embodiment of this application. The communication device 500 includes one or more processors 501, a communication line 502, and at least one communication interface 504 (FIG. 5 uses only an example in which a communication interface 504 and one processor 501 are included for description). In some embodiments, the communication device may further include a memory 503.

The processor 501 may be various computing devices that run software, such as a central processing unit (central processing unit, CPU), a microprocessor, a digital signal processor (DSP), a microcontroller unit (microcontroller unit, MCU), or an artificial intelligence processor. Each type of computing device may include one or more cores for executing software instructions to perform an operation or processing. Alternatively, the processor 501 may be an application-specific integrated circuit (application-specific integrated circuit, ASIC), or one or more integrated circuits configured to control program execution of the solutions in this application.

Figure 4:
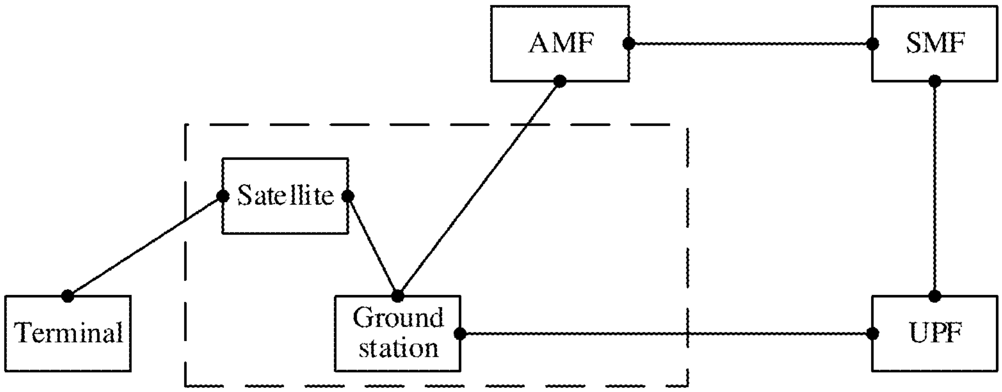
FIG. 4 is a schematic diagram of still another architecture of a communication system according to an embodiment of this application.

In a specific implementation, in an embodiment, the processor 501 may include one or more CPUs, for example, a CPU 0 and a CPU 1 in FIG. 4.

In some embodiments, the communication device 500 includes a plurality of processors, for example, a processor 501 and a processor 507 in FIG. 5. Each of these processors may be a single-core (single-core) processor, or may be a multi-core (multi-core) processor.

The communication line 502 may include a path for connecting different components.

The communication interface 504 may be a transceiver module, configured to communicate with another device or a communication network, such as an Ethernet, a RAN, or a wireless local area network (wireless local area network, WLAN). For example, the transceiver module may be an apparatus such as a transceiver or a transceiver. In some embodiments, the communication interface 504 may alternatively be a transceiver circuit located in the processor 501, and is configured to implement signal input and signal output of the processor.

The memory 503 may be an apparatus with a storage function. For example, the memory may be a read-only memory (read-only memory, ROM) or another type of static storage device capable of storing static information and instructions, may be a random access memory (random access memory, RAM) or another type of dynamic storage device capable of storing information and instructions, or may be an electrically erasable programmable read-only memory (electrically erasable programmable read-only memory, EEPROM), a compact disc read-only memory (compact disc read-only memory, CD-ROM) or other compact disc storage, optical disc storage (including a compressed optical disc, a laser disc, an optical disc, a digital versatile disc, a Blu-ray disc, or the like), a magnetic disk storage medium or another magnetic storage device, or any other medium capable of carrying or storing expected program code in a form of an instruction or a data structure and capable of being accessed by a computer. This is not limited thereto. The memory may exist independently and is connected to the processor by using a communication line 502. The memory may alternatively be integrated with the processor.

The memory 503 is configured to store computer executable instructions for executing the solutions of this application, and the processor 501 controls execution of the computer executable instructions. The processor 501 is configured to execute the computer executable instructions stored in the memory 503, to implement the multi-stream associated transmission method provided in embodiments of this application.

In some embodiments, in embodiments of this application, the processor 501 may alternatively perform a processing-related function in the method for controlling a terminal device to access a PLMN provided in the following embodiments of this application. The communication interface 504 is responsible for communicating with another device or a communication network. This is not specifically limited in embodiments of this application.

In some embodiments, the computer executable instructions in this embodiment of this application may also be referred to as application program code. This is not specifically limited in this embodiment of this application.

In a specific implementation, in an embodiment, the communication device 500 may further include an output device 505 and an input device 506. The output device 505 communicates with the processor 501, and may display information in a plurality of manners. For example, the output device 505 may be a liquid crystal display (liquid crystal display, LCD), a light emitting diode (light emitting diode, LED) display device, a cathode ray tube (cathode ray tube, CRT) display device, a projector (projector), or the like. The input device 506 communicates with the processor 501, and may receive user input in a plurality of manners. For example, the input device 506 may be a mouse, a keyboard, a touchscreen device, a sensor device, or the like.

Sometimes, the communication device 500 described above may also be referred to as a communication apparatus, and may be a general-purpose device or a dedicated device. For example, the communication device 500 may be a desktop computer, a portable computer, a network server, a personal digital assistant (personal digital assistant, PDA), a mobile phone, a tablet computer, a wireless terminal device, an embedded device, the foregoing terminal device, the foregoing network device, or a device having a structure similar to a structure shown in FIG. 5. A type of the communication device 500 is not limited in embodiments of this application.

Figure 1:
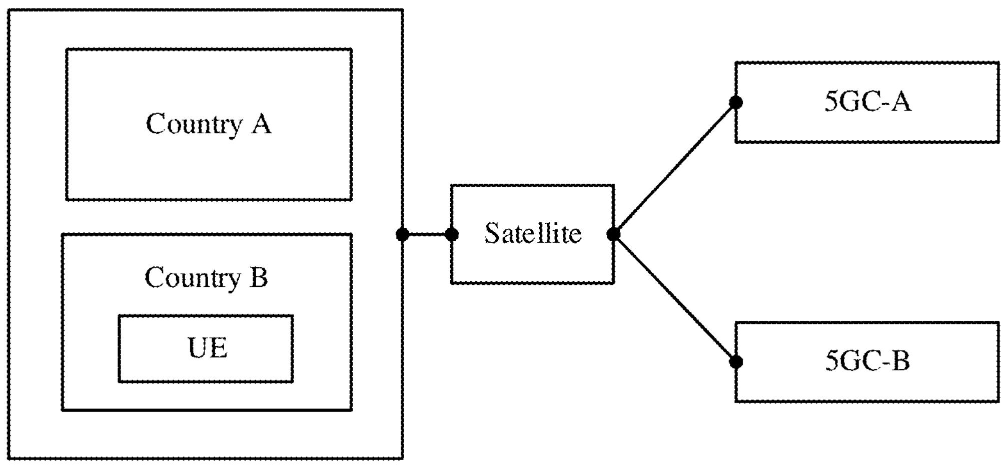
FIG. 1 is a schematic diagram of selecting a PLMN by UE according to an embodiment of this application.

As shown in FIG. 1, a communication satellite covers a large area and crosses countries. In a scenario shown in FIG. 1, UE is located in a country B, and a satellite signal received by the UE crosses countries. For example, the UE receives a PLMN-A broadcast signal and a PLMN-B broadcast signal of a satellite. According to regulatory requirements, the UE needs to access a core network corresponding to a current location, that is, a 5G core network corresponding to the country B, that is, 5GC-B in the figure. Therefore, to meet the regulatory requirements, the core network needs to verify a PLMN selected by the UE, to ensure that the PLMN accessed by the UE (that is, the PLMN selected by the UE) is a PLMN corresponding to the country in which the UE is currently located.

Currently, when the core network cannot verify the PLMN selected by the UE, the core network first accepts a non-access stratum (non-access stratum, NAS) process (that is, accepts a registration request of the UE). When subsequently obtaining positioning information of the UE, the core network verifies the PLMN accessed by the UE. If the UE is not allowed to access the PLMN in the current location, the core network deregisters the UE.

However, after the UE is allowed to register successfully, the UE may initiate a service. In this case, the UE initiates the service before the core network verifies the access of the UE to the PLMN, which violates the regulatory requirements.

To resolve this problem, the following describes an example of a method for controlling a terminal device to access a network according to an embodiment of this application with reference to the accompanying drawings.

It should be noted that, a network in embodiments of this application includes a public land mobile network (public land mobile network, PLMN), a 5G network, or a future network (for example, a 6G network). The PLMN is used to distinguish between different mobile communication operators in a country or region. In the following embodiments, that the network is the PLMN is used as an example. It may be understood that the PLMN in the following embodiments may be replaced with the 5G network or the future network. This is not limited in this application.

The PLMN accessed by the terminal in embodiments of this application may be understood as a PLMN to which the terminal establishes a connection, that is, a PLMN to which the terminal is about to register (or is performing a registration process) or has registered (or has completed a registration process). The PLMN accessed by the terminal may be replaced with a PLMN selected by the terminal, and the PLMN selected by the terminal may also be replaced with the PLMN accessed by the terminal.

Figure 6:
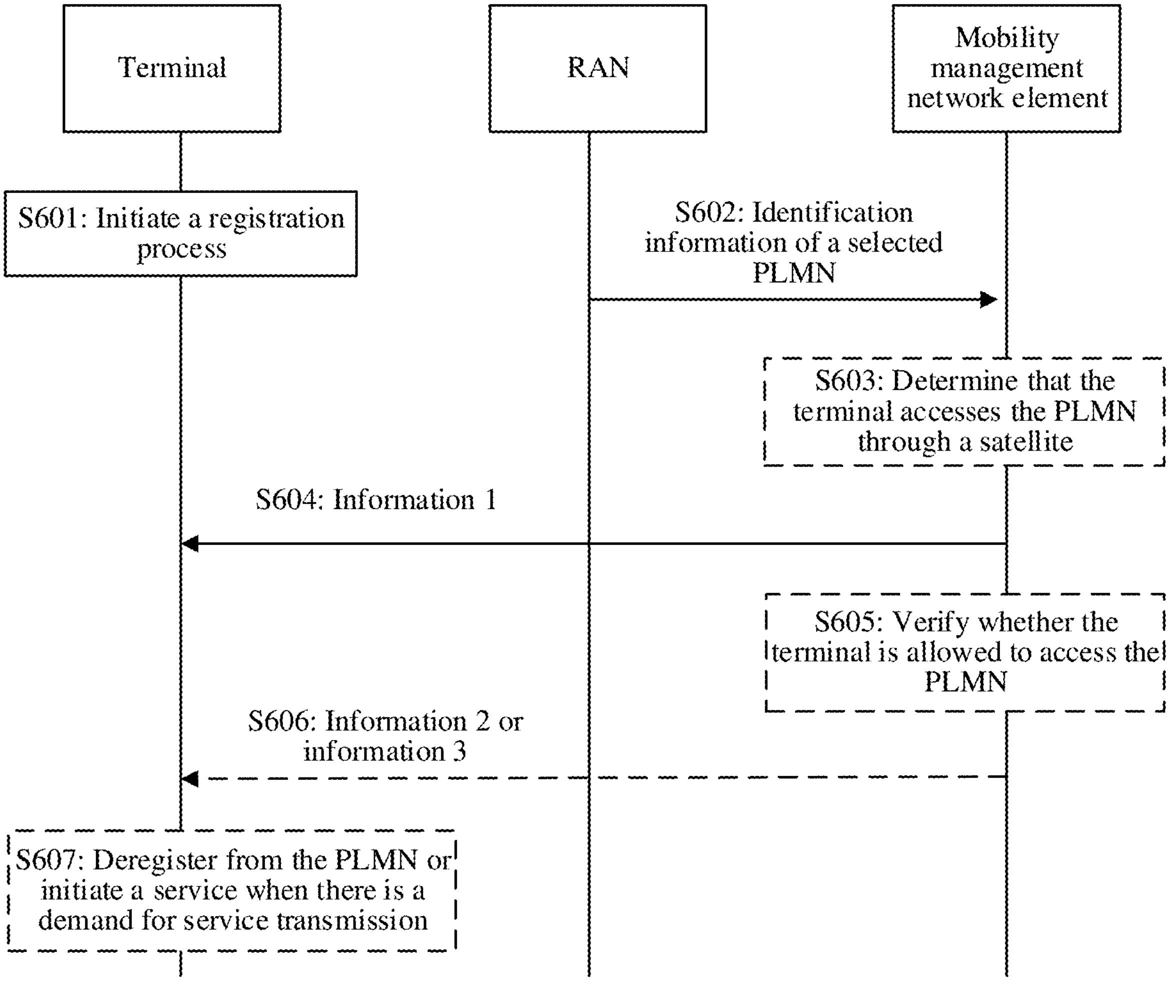
FIG. 6 shows a method for controlling a terminal device to access a network according to an embodiment of this application.

FIG. 6 shows a method for controlling a terminal device to access a network according to an embodiment of this application. In the method, a mobility management network element receives identification information of a PLMN from an access network device. When it is not determined whether the terminal device is allowed to access the PLMN, the mobility management network element sends, to the terminal device, information 1 indicating not to initiate a service. Specifically, as shown in FIG. 6, the method includes the following steps.

S601: A terminal initiates a registration process.

Specifically, the terminal sends an air interface message to the access network device (a RAN is used as an example below), and the RAN receives the air interface message (an AN message) from the terminal. The air interface message includes the identification information of the PLMN (selected PLMN) selected by the terminal and a registration request (registration request) message.

The identification information of the PLMN selected by the terminal is used to identify the PLMN selected by the terminal, and may be an identifier (identifier, ID) of the selected PLMN, or may be a PLMN ID and a network identification (network identification, NID).

In some embodiments, a registration request message includes information 6, where the information 6 is, for example, a follow-on request (follow-on request) instruction, and the information 6 indicates that the terminal has pending uplink signaling (UE has pending uplink signaling), that is, a receiver of the information 6 determines, based on the information 6, that the terminal has the pending uplink signaling.

S602: The RAN sends the identification information (for example, the selected PLMN ID) of the selected PLMN to the mobility management network element, and the mobility management network element receives the identification information of the selected PLMN from the RAN.

Specifically, the RAN sends the identification information of the selected PLMN to the mobility management network element via an N2 message (N2 message). The N2 message includes the registration request message and an air interface parameter, and the air interface parameter includes the identification information of the selected PLMN. The N2 message may further include information 7, where the information 7 is, for example, an access type indication, and the information 7 indicates that the UE accesses the network through a satellite. That is, a receiver of the information 7 determines, based on the information 7, that the terminal accesses the network through the satellite, or a receiver of the information 7 determines, based on the information 7, that an access type of the terminal is satellite access.

S603: In some embodiments, the mobility management network element determines that the terminal accesses the PLMN through the satellite.

For example, the mobility management network element determines, based on the N2 message, that the terminal accesses the PLMN through the satellite. Specifically, the mobility management network element determines, based on the information 7 included in the N2 message, that the terminal accesses the PLMN through the satellite.

Alternatively, the mobility management network element determines, based on an identifier of the RAN and an optional identifier of a tracking area, that the terminal accesses the PLMN through the satellite. The identifier of the RAN, or the identifier of the RAN and the identifier of the tracking area may be included in the N2 message.

S604: When it is not determined whether the terminal is allowed to access the PLMN, the mobility management network element sends, to the terminal, information 1 indicating not to initiate a service, and the terminal receives the information 1 from the mobility management network element.

Accordingly, the terminal does not initiate the service after receiving the information 1. Initiating the service includes initiating a session establishment process, initiating data transmission via a user plane, or initiating data transmission via a signaling plane. The initiating the session establishment process may specifically include: The terminal sends a session establishment request (session establishment request) message to a session management function network element.

That it is not determined whether the terminal is allowed to access the PLMN includes: The mobility management network element does not obtain a location of the terminal, or precision of a location of the terminal that is obtained by the mobility management network element is insufficient to determine whether the terminal is allowed to access the PLMN (the AMF is not aware of the UE location with sufficient accuracy to make a final decision). Specifically, although the mobility management network element obtains the location of the terminal, the precision of the location is insufficient to determine a country in which the current location of the terminal is located. For example, the mobility management network element obtains the identifier of the tracking area in which the terminal is located, and the tracking area covers areas of two countries. In this case, the location of the terminal is insufficient for the mobility management network element to determine the country in which the current location of the terminal is located. Therefore, it is insufficient for the mobility management network element to determine whether to allow the terminal to access the PLMN. In other words, that it is not determined whether the terminal is allowed to access the PLMN may be that the mobility management network element has not verified whether the terminal is allowed to access the PLMN (that is, that the terminal accesses the PLMN is not verified). It should be noted that, in embodiments of this application, that whether the terminal is allowed to access the PLMN is not verified includes a case in which the mobility management network element has not started to verify the PLMN accessed by the terminal, or has started to verify the PLMN accessed by the terminal, but the verification is not completed.

The information 1 indicates not to initiate a service. It may be understood that any information that enables a receiver of the information 1 not to initiate a service may be understood as the information 1. For example, the information 1 indicates that the PLMN accessed by the terminal has not been verified. After receiving the information 1, the terminal determines that the core network does not verify the PLMN accessed by the terminal, and further does not initiate a service. In this case, the information 1 is also considered as indicating not to initiate a service. For example, the information 1 indicates that the core network is to verify the PLMN selected by the terminal. After receiving the information 1, the terminal determines that the core network is to verify the PLMN selected by the terminal, and further does not initiate a service. In this case, the information 1 is also considered as indicating not to initiate a service. For example, the information 1 indicates to initiate a service after information indicating that initiation of the service is allowed is received. After receiving the information 1, the terminal initiates a service after receiving the information indicating that initiation of the service is allowed, and further, the terminal does not initiate a service before receiving the information indicating that initiation of the service is allowed. In this case, information 1 is also considered as indicating not to initiate a service.

The information 1 may indicate that the core network has not verified whether the terminal is allowed to access the PLMN, or indicates that the core network is verifying whether the terminal is allowed to access the PLMN, or indicates that the mobility management network element has not obtained positioning information of the terminal, or indicates that the mobility management network element is obtaining positioning information of the terminal. The information 1 may be specifically a cause value (cause), or may be a flag bit (flag).

For example, the mobility management network element sends the information 1 to the terminal when determining that the terminal accesses the PLMN through the satellite. Alternatively, the mobility management network element sends the information 1 to the terminal when determining that the terminal accesses the PLMN through the satellite and determining that whether the terminal is allowed to access the PLMN is not verified. Alternatively, the mobility management network element sends the information 1 to the terminal when determining that the terminal accesses the PLMN through the satellite, determining that whether the terminal is allowed to access the PLMN is not verified, and determining that the terminal needs to initiate a service subsequently. The mobility management network element may determine, based on the received information 6, that the terminal needs to initiate the service subsequently.

Specifically, that the mobility management network element sends the information 1 to the terminal includes: The mobility management network element sends a message 1 to the terminal, where the message 1 includes the information 1. The mobility management network element may further send the message 1 to the terminal in the following two manners.

Manner 1: The mobility management network element sends a registration accept (registration accept) message to the terminal, that is, the registration accept message is the message 1, and the registration accept message includes the information 1.

Manner 2: The mobility management network element sends a response message of a session establishment request to the terminal, that is, the response message of the session establishment request is the message 1, and the response message of the session establishment request includes the information 1. The response message of the session establishment request includes a session establishment accept message or a session establishment reject message.

It should be noted that in Manner 2, steps S602*a* and S602*b* need to be performed after S602.

S602*a*: The mobility management network element sends the registration accept message to the terminal, and the terminal device receives the registration accept message from the mobility management network element.

S602*b*: The mobility management network element receives the session establishment request from the terminal, and the terminal receives the session establishment request from the mobility management network element.

In some embodiments, the message 1 includes a timer 1 or a timer 2. Correspondingly, the registration accept message in Manner 1 includes the timer 1 or the timer 2, and the response message in Manner 2 includes the timer 1 or the timer 2.

The timer 1 indicates that deregistration is to be initiated after the timer 1 expires, or indicate that initiation of a service is allowed when information indicating that initiation of a service is allowed is received within duration of the timer 1. In other words, the terminal does not initiate a service within the duration of the timer 1, and if no information indicating that initiation of a service is allowed or that access to a PLMN is not allowed is received within the duration of the timer 1, the terminal initiates deregistration after the timer 1 expires. That the terminal initiates deregistration is specifically that the terminal sends a deregistration request message to the mobility management network element. It may be understood that, before the timer 1 expires, that is, within the duration of the timer 1, if the information indicating that initiation of a service is allowed or that access to a PLMN is not allowed is received, the timer 1 is reset.

The timer 2 indicates that initiation of a service is to be allowed after the timer 2 expires. It should be noted that any timer that enables a receiver of the timer 2 to determine, after the timer 2 expires, that a service is allowed to be initiated may be understood as the timer 2 in embodiments of this application. For example, the timer 2 indicates that access to a PLMN is to be allowed after the timer 2 expires. After the timer 2 expires, the terminal determines that access to the PLMN is allowed, to determine that initiation of a service is allowed. In this case, the timer 2 may alternatively be understood as indicating that initiation of a service is to be allowed after the timer 2 expires. When the terminal receives information indicating that access to the PLMN is not allowed before the timer 2 expires, that is, within duration of the timer 2, the timer 2 is reset.

Further, the duration of the timer 1 and the timer 2 is greater than or equal to time for the mobility management network element to verify that the terminal accesses the PLMN.

In some embodiments, the method may further include S605 to S607.

S605: The mobility management network element verifies whether the terminal is allowed to access the PLMN.

Specifically, the mobility management network element initiates a positioning process, obtains positioning information of the terminal, and verifies, based on the positioning information of the terminal, that the terminal accesses the PLMN.

For a positioning process, refer to an existing positioning process, for example, refer to a related protocol of the 3rd generation partnership project (3rd generation partnership project, 3GPP). Details are not described herein again.

The positioning information of the terminal may include at least one of the following: longitude, latitude, or altitude of the terminal.

That the mobility management network element verifies, based on the positioning information of the terminal, that the terminal accesses the PLMN may be specifically:

1. The mobility management network element determines, based on the positioning information of the terminal and coverage of the PLMN accessed by the terminal, whether the PLMN accessed by the terminal is the PLMN in which the current location of the terminal is located. If the PLMN accessed by the terminal is the PLMN in which the current location of the terminal is located, it means that the mobility management network element determines to allow the terminal to access the PLMN in which the terminal is currently accessed (it may be understood that the PLMN currently accessed by the terminal and the PLMN accessed by the terminal are the same); or if the PLMN accessed by the terminal is not the PLMN in which the current location of the terminal is located, it means that the mobility management network element determines not to allow the terminal to access the PLMN currently accessed by the terminal.
2. The mobility management network element converts the positioning information of the terminal into identification information of a country in which the location is located, and further determines whether the location is a country corresponding to a PLMN currently accessed by the terminal. If the location is the country corresponding to the PLMN currently accessed by the terminal, the mobility management network element determines that the terminal is allowed to access the PLMN currently accessed by the terminal; or if the location is not the country corresponding to the PLMN currently accessed by the terminal, the mobility management network element determines that the terminal is not allowed to access the PLMN currently accessed by the terminal. It should be noted that, the converting the positioning information of the terminal into the identification information of the country in which the location is located may alternatively be determined by a location management function (location management function, LMF) network element.

S606: The mobility management network element sends, based on a verification result, information 2 or information 3 to the terminal or does not perform an operation related to the verification, and correspondingly, the terminal receives the information 2 or information 3 from the mobility management network element or does not receive information related to the verification.

Specifically, the mobility management network element sends downlink non-access stratum transport (downlink (DL) NAS transport) to the terminal, where the DL NAS transport includes the information 2 or information 3, or the DL NAS transport is the information 2 or information 3.

Specific cases of S606 are as follows:

Case 1: When the verification result is that it is determined that the terminal is allowed to access the currently accessed PLMN, the information 2 is sent to the terminal.

Case 2: When the verification result is that it is determined that the terminal is allowed to access the PLMN currently accessed by the terminal and the mobility management network element has provided the timer 2 for the terminal, no operation related to this verification is performed.

Case 3: When the verification result is that it is determined that the terminal is not allowed to access the currently accessed PLMN, the information 3 is sent to the terminal.

It should be noted that, when the verification result is that it is determined that the terminal is allowed to access the currently accessed PLMN and the mobility management network element has provided the timer 1 for the terminal, within the duration of the timer 1, the mobility management network element sends the information 2 to the terminal after completing verification, to indicate that the terminal is allowed to initiate a service, and this case may be included in case 1 described above; and when the verification result is that it is determined that the terminal is not allowed to access and the mobility management network element has provided the timer 1 or the timer 2 for the terminal, within the duration of the timer 1 or the timer 2, the mobility management network element sends the information 3 to the terminal after completing verification, to indicate that the terminal is not allowed to access the current accessed PLMN, and this case may be included in case 3 described above.

It should be understood that, when the verification result is that it is determined that the terminal is not allowed to access the currently accessed PLMN and the mobility management network element has provided the timer 1 for the terminal, if the terminal does not receive the information 2 or the information 3 within the duration of the timer 1, the terminal initiates deregistration after the timer 1 expires. That is, the terminal sends the deregistration request message to the mobility management network element.

However, if due to a reason such as a fault or a poor air interface condition, when the verification result is that it is determined that the terminal is allowed to access the currently accessed PLMN and the mobility management network element has provided the timer 1 for the terminal, the terminal fails to receive the information 2 within the duration of the timer 1, and the terminal also initiates deregistration. When the verification result is that it is determined that the terminal is not allowed to access and the mobility management network element has provided the timer 2 for the terminal, the terminal fails to receive the information 3 within the duration of the timer 2, and the terminal initiates a service after the timer 2 expires.

The information 2 indicates that initiation of a service is allowed. It may be understood that any information that enables a receiver of the information 2 to learn that initiation of a service is allowed may be understood as the information 2. For example, the information 2 indicates that access to a currently accessed PLMN is allowed. After receiving the information 2, the terminal learns that access to the PLMN is allowed, and further determines that initiation of a service is allowed. In this case, the information 2 is also considered as indicating that initiation of a service is allowed.

The information 3 indicates that access to the currently accessed PLMN is not allowed. It may be understood that any information that enables a receiver of the information 3 to learn that access to the currently accessed PLMN is not allowed may be understood as the information 3. For example, the information 3 indicates that initiation of a service is not allowed. After receiving the information 3, the terminal learns that initiation of a service is not allowed, and further learns that access to the PLMN is not allowed. In this case, the information 3 is also considered as indicating that access to the currently accessed PLMN is not allowed.

In some embodiments, the information 3 is a deregistration request (deregistration request) message, that is, the foregoing DL NAS transport is the deregistration request message, and the deregistration request message indicates that the terminal is not allowed to access the PLMN currently accessed by the terminal.

The DL NAS transport may include the identification information of the PLMN that the UE is allowed to access at the current location, or a mobile country code (Mobile Country Code, MCC) of identification information of a country that the UE is allowed to access.

S607: The terminal deregisters from the PLMN to which the terminal is currently connected or initiates a service when the terminal has a service transmission requirement.

That the terminal initiates a service based on the received information 2 or after the timer 2 expires may specifically include initiating a session establishment process, initiating data transmission via a user plane, or initiating data transmission via a signaling plane. The initiating the session establishment process may specifically include that the terminal sends a session establishment request to the mobility management network element.

Alternatively, the terminal deregisters from the currently accessed PLMN based on the received information 3. Specifically, the terminal may deregister after receiving a deregistration request message from the mobility management network element.

In some embodiments, after receiving the information 3, the UE reselects a PLMN after deregistration from the PLMN. If the DL NAS transport includes the identification information or the mobile country code (mobile country code, MCC) of the PLMN that the UE is allowed to access at the current location, the UE accesses the PLMN corresponding to the identification information.

In the method, when the mobility management network element does not determine whether the terminal device is allowed to access the PLMN, the mobility management network element indicates the terminal device not to initiate a service. In this way, the terminal device is prevented from initiating a service before whether the terminal device is allowed to access the PLMN is verified, so that compliance with regulatory requirements is ensured.

Figure 7:
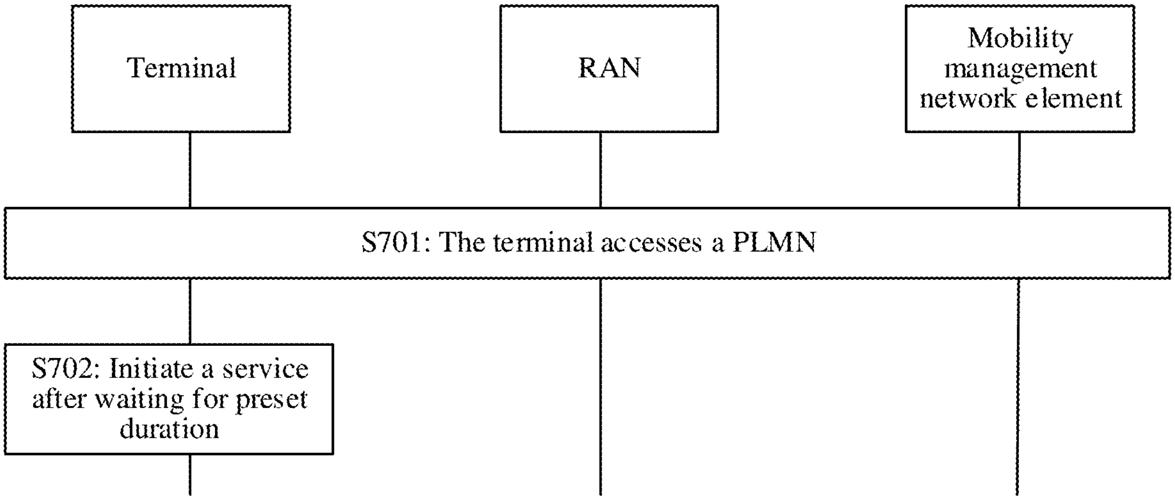
FIG. 7 shows another method for controlling a terminal device to access a network according to an embodiment of this application.

FIG. 7 shows another method for controlling a terminal device to access a network according to an embodiment of this application. In the method, the terminal device accesses a PLMN, and initiates a service to a mobility management network element after preset duration expires. Specifically, as shown in FIG. 7, the method includes the following steps.

S701: A terminal accesses the PLMN.

Specifically, the terminal sends a registration request message to the mobility management network element, and receives a registration accept message from the mobility management network element. For that the terminal sends the registration request message to the mobility management network element, refer to descriptions in S601 and S602. Details are not described herein again.

In some embodiments, the terminal accesses the PLMN through a satellite.

S702: The terminal initiates a service after waiting for preset duration.

In some embodiments, the preset duration is greater than duration for a core network to verify whether the terminal is allowed to access the PLMN.

For example, if the terminal determines that the terminal accesses the PLMN through the satellite, the terminal initiates the service after waiting for the preset duration. The initiating the service may include initiating a session establishment process, initiating data transmission via a user plane, or initiating data transmission via a signaling plane. The initiating the session establishment process may specifically include that the terminal sends a session establishment request to the mobility management network element.

The preset duration may be provided by the mobility management network element in the PLMN for the terminal, or may be locally configured by the terminal.

In this method, based on logic of the terminal, the terminal is prevented from initiating a service before the core network verifies whether the terminal device is allowed to access the PLMN, so that compliance with regulatory requirements is ensured.

Figure 8:
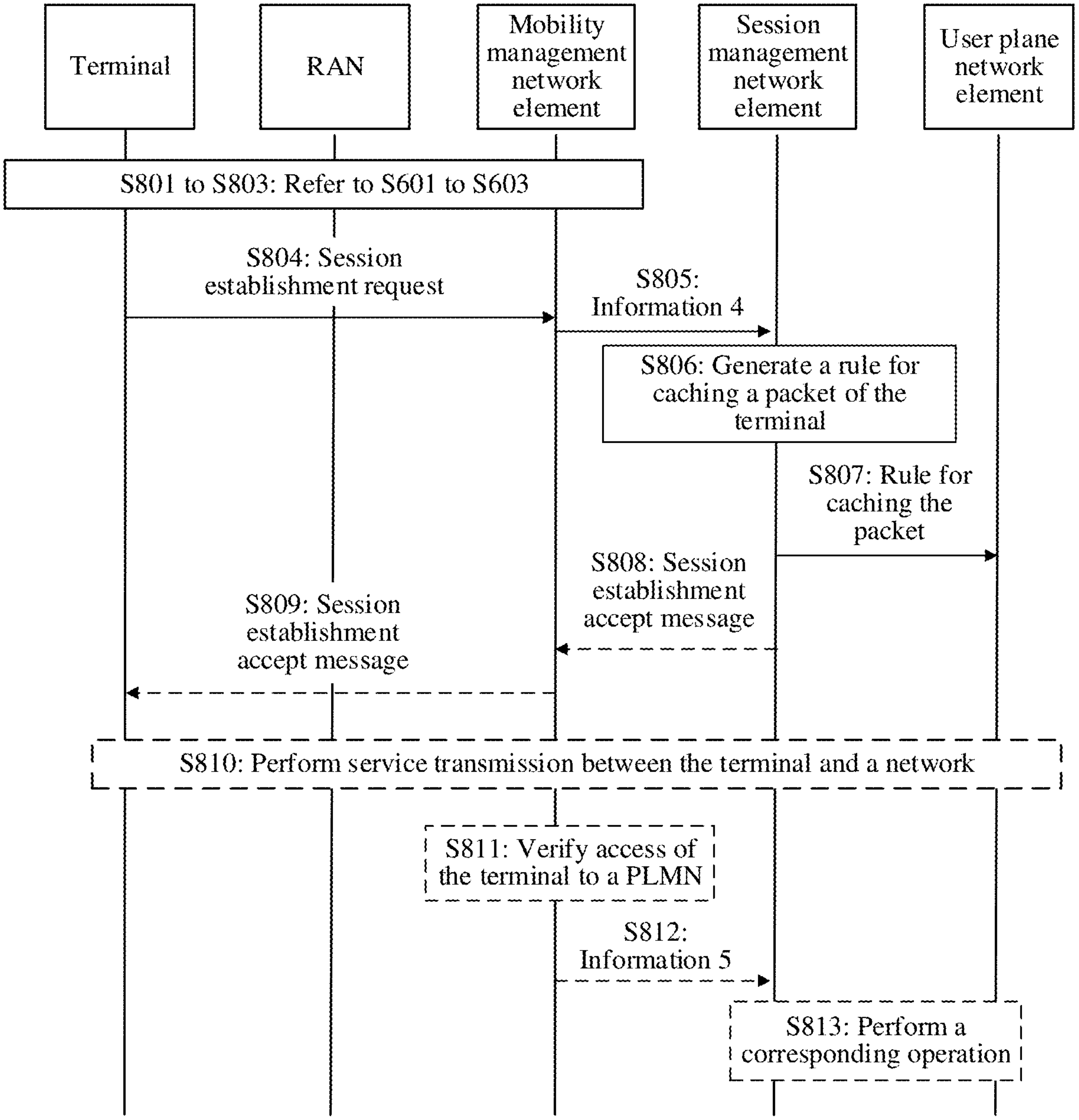
FIG. 8 shows still another method for controlling a terminal device to access a network according to an embodiment of this application.

FIG. 8 shows still another method for controlling a terminal device to access a network according to an embodiment of this application. In the method, a mobility management network element receives identification information of a PLMN from an access network device; and when it is not determined whether the terminal device is allowed to access the PLMN, the mobility management network element indicates, to a session management network element, to generate a rule for caching a packet of the terminal device, and after generating the rule, the session management network element provides the rule for a user plane function; and a user plane network element caches the packet of the terminal according to the rule. Specifically, as shown in FIG. 8, the method includes the following steps.

For S801 to S803, refer to S601 to S603. Details are not described herein again.

S804: The terminal sends a session establishment request to the mobility management network element, and the mobility management network element receives the session establishment request from the terminal.

Specifically, the session establishment request is carried in a NAS message sent by the terminal to the mobility management network element.

S805: When it is not determined whether the terminal is allowed to access a PLMN, the mobility management network element sends information 4 to a session management network element, and the session management network element receives the information 4 from the mobility management network element.

For example, the mobility management network element sends the information 4 to the session management network element when determining that the terminal accesses the PLMN through a satellite. Alternatively, the mobility management network element sends the information 4 to the session management network element when determining that the terminal accesses the PLMN through a satellite and not verifying whether the terminal is allowed to access the PLMN. The information 4 may be included in an N11 message sent to the session management network element by the mobility management network element.

The information 4 indicates to generate the rule for caching (or discarding, the caching in the following sections can be replaced with discarding) the packet of the terminal. It may be understood that any information used to enable a receiver of the information 4 to generate the rule for caching the packet of the terminal may be understood as the information 4. For example, the information 4 indicates that the PLMN accessed by the terminal is not verified. After receiving the information 4, the SMF determines that the mobility management network element has not verified the PLMN accessed by the terminal, and further formulates a rule for caching a packet of the terminal. The information 4 in this case is also considered as indicating to generate a rule for caching a UE packet.

In some embodiments, the N11 message (or referred to as a message 2) further includes a timer 3 or a timer 4, and the timer 3 indicates that a session release process is to be initiated after the timer 3 expires. For example, the session management network element sends a session release request message to the user plane network element, or the user plane network element triggers the session management network element to send the session release request message to the user plane network element. The timer 4 indicates that a rule is to be updated after the timer 4 expires, and an updated rule indicates to transmit a packet of the terminal device. Alternatively, the timer 3 or the timer 4 is locally configured in the session management network element.

S806: The session management network element generates, based on the information 4, the rule for caching the packet of the terminal.

The rule may be an N4 rule (N4 rule). In some embodiments, the rule includes the timer 3 or the timer 4. In other words, the timer 3 or the timer 4 is maintained by the user plane network element.

It should be noted that, the timer 3 or the timer 4 may alternatively be maintained by the session management network element, that is, the timer 3 or the timer 4 does not need to be included in the rule.

S807: The session management network element sends, to a user plane function network element, the rule for caching the packet of the terminal, and the user plane function network element receives, from the session management network element, the rule for caching the packet of the terminal.

Correspondingly, the rule may include the timer 3 or the timer 4.

In some embodiments, the method may further include S808 to S813. The method includes:

S808: The session management network element sends a session establishment accept message to the mobility management network element.

The session establishment accept message may include an N11 response message (N11 ACK message) sent by the session management network element to the mobility management network element.

S809: The mobility management network element sends the session establishment accept message to the terminal.

S810: Service transmission is performed between the terminal and a network.

For example, the terminal transmits an uplink packet, and the uplink packet is sent by the terminal to the user plane network element via a RAN. Alternatively, a network side initiates a service, and a downlink packet is sent by a DN to the user plane network element.

The user plane network element caches the uplink packet or the downlink packet based on the received rule. S811: The mobility management network element verifies access of the terminal to the PLMN.

For this step, refer to the description in S605. Details are not described herein again.

S812: The mobility management network element sends information 5 to the session management network element based on the verification result, or initiates a deregistration process or skips performing an operation related to the verification.

Specific cases of S811 are as follows:

Case 1: When the verification result is that it is determined that the terminal is allowed to access the currently accessed PLMN, the information 5 is sent to the session management network element, to indicate an update of the rule to transmit a packet of the terminal.

Case 2: When the verification result is that it is determined that the terminal is allowed to access the currently accessed PLMN, and the session management network element or the user plane network element maintains the timer 4, no operation related to the verification is performed.

Case 3: When the verification result is that it is determined that the terminal is not allowed to access the currently accessed PLMN, a deregistration process is initiated.

The deregistration request process includes that the mobility management network element sends a deregistration request message to the terminal or the mobility management network element sends a release session management context request (release SM context request) message to the session management network element.

It should be noted that, when the verification result is that it is determined that the terminal is allowed to access the currently accessed PLMN, and the session management network element or the user plane network element maintains the timer 3, within duration of the timer 3, the mobility management network element sends the information 5 to the session management network element after completing verification, to indicate an update of the rule to transmit the packet of the terminal, and this case may be included in case 1 described above; and when the verification result is that it is determined that the terminal is not allowed to access the currently accessed PLMN, and the session management network element or the user plane network element maintains the timer 3 or the timer 4, at the timer 3 or the timer 4, the mobility management network element initiates a deregistration process after completing verification, and this case may be included in case 3 described above.

It should be understood that, when the verification result is that it is determined that the terminal is not allowed to access the currently accessed PLMN and the session management network element or the user plane network element maintains the timer 3, the mobility management network element may not send the release session management context request message to the session management network element. After the timer 3 expires, the session management network element or the user plane network element initiates a session release process. For example, the session management network element sends a session release request message to the user plane network element, or the user plane network element triggers the session management network element to send a session release request message to the user plane network element.

The information 5 indicates to update the rule, and the updated rule indicates to transmit the packet of the terminal. It may be understood that any information used to enable the receiver of the information 5 to learn that the rule is updated for transmitting the packet of the terminal may be understood as the information 5. For example, the information 5 indicates that the terminal is allowed to access the PLMN. After receiving the information 5, the session management network element learns that the terminal is allowed to access the PLMN, and further updates the rule to transmit the packet of the terminal. In this case, the information 5 is also considered as indicating that the rule is updated for transmitting the packet of the terminal.

S813: Correspondingly, the session management network element or the user plane network element performs a corresponding operation.

In this step:

1. Corresponding to case 1 in S812, the session management network element updates the rule based on the information 5, and sends the updated rule to the user plane network element.
2. Corresponding to case 2 in S812, the session management network element maintains the timer 4. After the timer 4 expires, the session management network element updates the rule, and sends an updated rule to the user plane network element. The user plane network element transmits the packet of the terminal based on the updated rule. Corresponding to the case 2 in S812, the user plane network element maintains the timer 4. After the timer 4 expires, the user plane network element updates the rule, and transmits the packet of the terminal based on the updated rule.
3. Corresponding to case 3 in S812, the session management network element releases a session management context.

In the method, when the mobility management network element does not determine whether the terminal device is allowed to access the PLMN, the mobility management network element indicates the session management network element to generate the rule for caching the terminal device. Then, the session management network element provides the rule for the user plane network element, and the user plane network element caches the packet according to the rule, to avoid packet transmission before access of the terminal device to the PLMN is verified, so that compliance with regulatory requirements is ensured.

Figure 9:
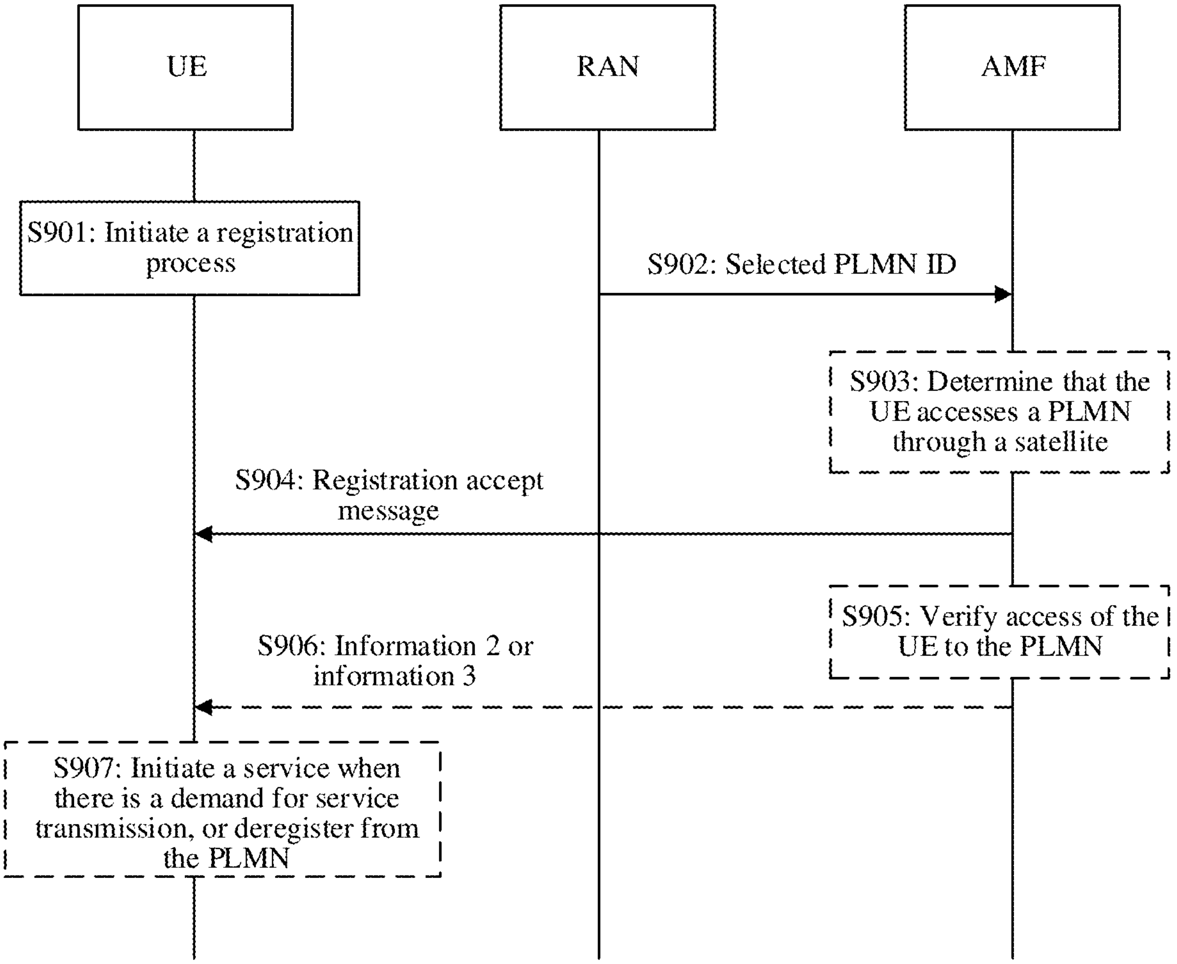
FIG. 9 shows a method for controlling a terminal device to access a network according to an embodiment of this application.

Based on the embodiment shown in FIG. 6, FIG. 9 shows a method for controlling UE to access a PLMN according to this application. In the method, that a terminal is the UE and a mobility management network element is an AMF is used as an example, and the method includes the following steps.

S901: The UE initiates a registration process.

For specific descriptions of this step, refer to S601. Details are not described herein again.

S902: A RAN sends a selected PLMN ID to the AMF.

Specifically, the RAN sends the selected PLMN ID to the AMF via an N2 message. The N2 message includes an air interface parameter and a registration request message. For specific descriptions of the N2 message, refer to S602. Details are not described herein again.

S903: In some embodiments, the AMF determines, based on the N2 message, that the UE accesses a PLMN through a satellite.

Specifically, the AMF may determine, based on information 7 included in the N2 message, that the UE accesses the network through the satellite. Alternatively, the AMF determines, based on a RAN identifier and an optional identifier of a tracking area, that the UE accesses the network through the satellite.

S904: When it is not determined whether the UE is allowed to access the PLMN, the AMF sends a registration accept message to the UE, where the registration accept message includes information 1 indicating not to initiate a service.

Correspondingly, the UE receives the information 1 from the AMF, and does not initiate the service. The initiating the service includes initiating a session establishment process, initiating data transmission via a user plane, or initiating data transmission via a signaling plane. The initiating the session establishment process may specifically include that the terminal sends a session establishment request to the mobility management network element.

For specific description about that it is not determined whether the UE is allowed to access the PLMN, refer to S604. For specific descriptions of the information 1, refer to S604. Details are not described herein again.

In some embodiments, when determining that the UE accesses the network through the satellite, the AMF sends the information 1 to the UE. Alternatively, when the AMF determines that the UE accesses the network through the satellite and determines that whether the UE is allowed to access the PLMN is not verified, the AMF sends the information 1 to the UE. Alternatively, when the AMF determines that the UE accesses the PLMN through the satellite, determines that whether the UE is allowed to access the PLMN is not verified, and determines that the UE needs to subsequently initiate a session establishment process, the AMF sends the information 1 to the UE. The AMF may determine, based on the received information 6 in S901, that the UE needs to subsequently initiate the session establishment process.

S905: The AMF verifies access of the UE to the PLMN.

Specifically, the AMF initiates a positioning process, obtains positioning information of the UE, and verifies, based on the positioning information of the UE, that the UE accesses the PLMN.

For the positioning process in this step, refer to an existing positioning process, for example, refer to a related protocol of 3GPP. Details are not described herein again. The positioning information includes at least one of the following: longitude, latitude, and altitude of the UE.

For specific description of that the AMF verifies, based on the positioning information of the UE, that the UE accesses the PLMN, refer to S605. Details are not described herein again.

S906: The AMF sends information 2 or information 3 to the UE based on the verification result.

Specifically, the AMF sends DL NAS transport to the UE, where the DL NAS transport includes the information 2 or the information 3, or the information 2 or the information 3 is the DL NAS transport. When the verification result is that the UE is allowed to access the PLMN currently accessed by the UE, the AMF sends the information 2 to the UE. When the verification result is that the UE is not allowed to access the PLMN currently accessed by the UE, the AMF sends the information 3 to the UE.

For specific descriptions of the information 2 and the information 3, refer to S606. Details are not described herein again.

It should be noted that, when the AMF determines that the UE is not allowed to access the PLMN currently accessed by the UE, the DL NAS transport may be a deregistration request message. In this case, the deregistration request message indicates that the UE is not allowed to access the PLMN currently accessed by the UE, that is, the deregistration request message is the information 3.

S907: The UE initiates a service when there is a service transmission requirement based on the information 2; or deregisters from the PLMN based on the received information 3.

In some embodiments, after receiving the information 3 (for example, a deregistration request message), the UE reselects a PLMN. If the information 3 includes the identification information or the MCC of the PLMN that the UE is allowed to access at a current location, the UE accesses the PLMN corresponding to the identification information.

Figure 10:
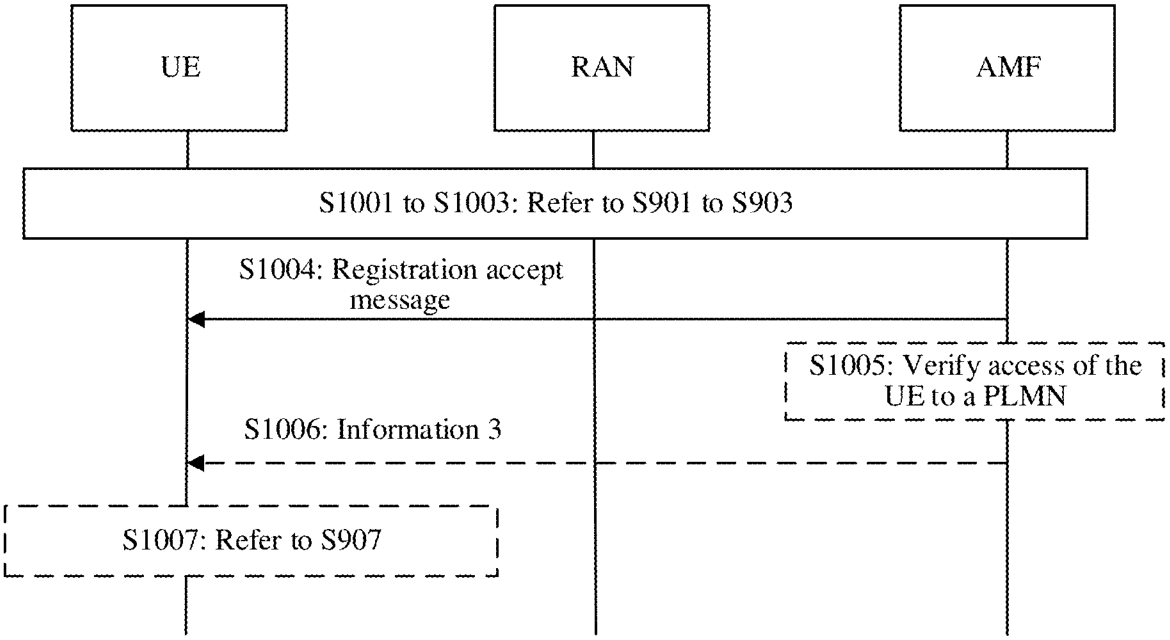
FIG. 10 shows a method for controlling UE to access a PLMN according to an embodiment of this application.

Based on the embodiment shown in FIG. 6, FIG. 10 shows a method for controlling UE to access a PLMN according to this application. In the method, that a terminal is the UE and a mobility management network element is an AMF is used as an example, and the method includes the following steps.

For S1001 to S1003, refer to S901 to S903. Details are not described herein again.

S1004: When it is not determined whether the UE is allowed to access the PLMN, the AMF sends a registration accept message to the UE, where the registration accept message includes information 1 indicating not to initiate a service.

The registration accept message includes a timer 2, and the terminal starts timing after receiving the timer 2. Alternatively, the timer 2 is locally configured in the UE, and the UE starts timing after receiving the registration accept message. The timer 2 indicates that the UE is allowed to initiate a service after the timer 2 expires, that is, the UE does not initiate a service within duration of the timer 2, and the UE is allowed to initiate a service after the timer 2 expires. Further, the duration of timer 2 is longer than the duration for the AMF to verify the access of the UE to the PLMN.

For other descriptions of this step, refer to S904. Details are not described herein again.

For S1005, refer to S905. Details are not described herein again.

S1006: The AMF sends information 3 to the UE based on the verification result, or skips performing an operation related to the verification.

When the verification result is that the UE is allowed to access the PLMN currently accessed by the UE, the AMF skips performing the operation related to the verification. When the verification result is that the UE is not allowed to access the PLMN currently accessed by the UE, the AMF sends the information 3 to the UE. For specific descriptions of the information 3, refer to S606. Details are not described herein again.

The information 3 sent by the AMF to the UE may be DL NAS transport sent by the AMF to the UE. The DL NAS transport is a deregistration request message, that is, the information 3 is the deregistration request message.

S1007: The UE deregisters from the current PLMN based on the received information 3; or after the timer 2 expires, the UE initiates a service when there is a service transmission requirement.

Specifically, when the verification result is that the UE is not allowed to access the PLMN currently accessed by the UE, the UE deregisters from the current PLMN based on the received information 3 (for example, a deregistration request message). If the verification result is that the UE is allowed to access the PLMN currently accessed by the UE, after the timer 2 expires, the UE initiates a service when there is a service transmission requirement.

The initiating the service may specifically include initiating a session establishment process, initiating data transmission via a user plane, or initiating data transmission via a signaling plane. The initiating the session establishment process may specifically include that the UE sends a session establishment request to the AMF.

In some embodiments, after receiving the information 3 (for example, the deregistration request), the UE reselects a PLMN. If the DL NAS transport includes the identification information or the MCC of the PLMN that the UE is allowed to access at a current location, the UE accesses the PLMN corresponding to the identification information.

Figure 11:
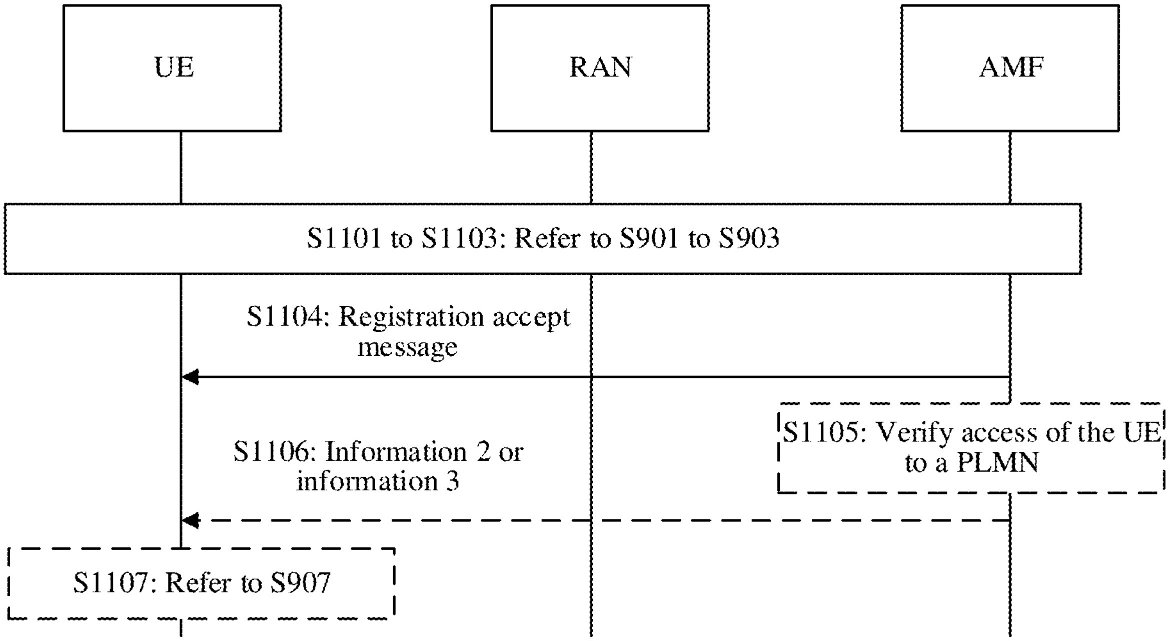
FIG. 11 shows a method for controlling UE to access a PLMN according to an embodiment of this application.

Based on the embodiment shown in FIG. 6, FIG. 11 shows a method for controlling UE to access a PLMN according to this application. In the method, that a terminal is the UE and a mobility management network element is an AMF is used as an example, and the method includes the following steps.

For S1101 to S1103, refer to S901 to S903. Details are not described herein again.

S1104: When it is not determined whether the UE is allowed to access the PLMN, the AMF sends a registration accept message to the UE, where the registration accept message includes information 1 indicating not to initiate a service.

The registration accept message includes a timer 1, and the terminal starts timing after receiving the timer 1. Alternatively, a timer 1 is locally configured in the UE, and the UE starts timing after receiving the registration accept message. The timer 1 indicates that deregistration is to be initiated after the timer 1 expires. That is, the UE does not initiate a service within the duration of timer 1, and initiates deregistration after the timer 1 expires. The UE initiates deregistration. Specifically, the UE sends a deregistration request message to the AMF. Further, the duration of timer 1 is longer than the duration for the AMF to verify the PLMN accessed by the UE.

For other descriptions of this step, refer to S904. Details are not described herein again.

For S1105, refer to S905. Details are not described herein again.

S1106: The AMF sends information 2 or information 3 to the UE based on the verification result.

For other descriptions of this step, refer to S906. Details are not described herein again.

It should be noted that, when the verification result is that it is determined that the UE is not allowed to access the currently accessed PLMN, the AMF may skip performing an operation related to this verification, that is, the AMF does not need to send the information 3, and the UE initiates deregistration after the timer 1 expires.

For S1107, refer to S907. Details are not described herein again.

Figure 12:
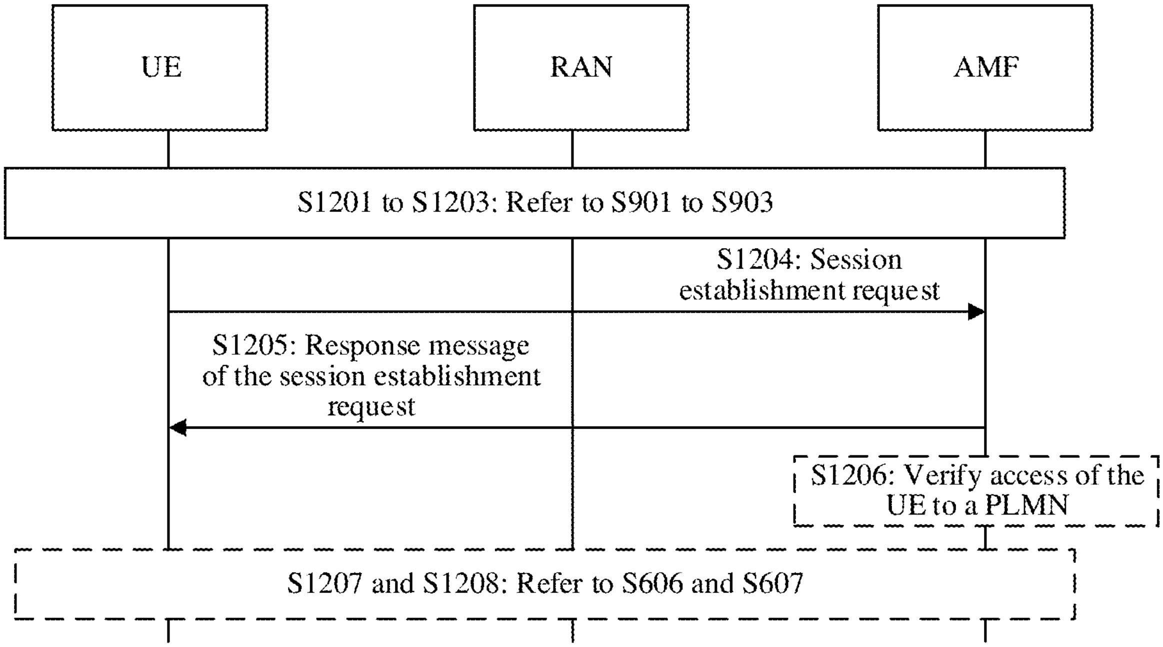
FIG. 12 shows a method for controlling UE to access a PLMN according to an embodiment of this application.

Based on the embodiment shown in FIG. 6, FIG. 12 shows a method for controlling UE to access a PLMN according to this application. In the method, that a terminal is the UE and a mobility management network element is an AMF is used as an example, and the method includes the following steps.

For S1201 to S1203, refer to S901 to 903.

S1204: The UE sends a session establishment request to the AMF.

Specifically, the UE sends a NAS message 01 to the AMF, where the NAS message 01 includes a session establishment request.

S1205: If the AMF does not determine whether the UE is allowed to access the PLMN, the AMF sends a response message of the session establishment request to the UE.

The response message may be a session establishment accept message or a session reject message, and the response message includes information 1 indicating not to initiate a service, or the response message is information 1. Alternatively, the response message is a message indicating that the AMF accepts or rejects session establishment. For example, the response message is a NAS message 02 sent when the AMF accepts session establishment of the UE, or a NAS message 02 sent when the AMF rejects session establishment of the UE.

In another example, when the response message is a session establishment accept message or a session reject message, the response message may come from the SMF. The AMF includes the response message in the NAS message 02, and sends, to the UE, the NAS message 02 that includes the response message. Before that, the AMF may send indication information to the SMF, where the indication information may indicate that it is not determined whether the terminal is allowed to access the PLMN (or indicates that the PLMN selected by the UE is not verified, the AMF does not obtain the positioning information of the UE, or the AMF is obtaining the positioning information of the UE). The SMF sends, via the AMF, the response message to the UE based on the indication information from the AMF, where the response message includes information 1 indicating not to initiate a service, or the response message itself is information 1. In some embodiments, the SMF determines to indicate the UE not to initiate a service, and then sends the response message to the UE by using the AMF.

In some embodiments, when determining that the terminal accesses the PLMN through a satellite, the AMF sends the response message to the UE. Alternatively, when determining that the terminal accesses the PLMN through a satellite and uncertain whether the terminal is allowed to access the PLMN, the AMF sends the response message to the UE. For example, a case in which it is not determined whether the terminal is allowed to access the PLMN includes that the AMF has not verified the PLMN selected by the UE, the AMF does not obtain positioning information of the UE, or the AMF is obtaining positioning information of the UE.

For specific descriptions of the information 1, refer to S604. Details are not described herein again. It should be noted that, the information 1 in the method may be a cause value (cause), and the information 1 may indicate that the AMF does not verify the PLMN selected by the UE, the AMF is verifying the PLMN selected by the UE, or the AMF has not obtained positioning information of the UE or is obtaining the positioning information of the UE.

For ease of description, that the information 1 is a cause value is used as an example in the following process. The following cause value may be replaced with another form of the information 1, which is not limited.

In some embodiments, the response message includes a timer 1 or a timer 2. Alternatively, the UE itself is configured with the timer 1 or the timer 2, and the UE receives the response message, and triggers timing of the timer 1 or the timer 2. For specific descriptions of the timer 1 or the timer 2, refer to S604. Details are not described herein again.

For S1206, refer to S905. Details are not described herein again.

For S1207 and S1208, refer to S606 and S607. Details are not described herein again.

Figure 13:
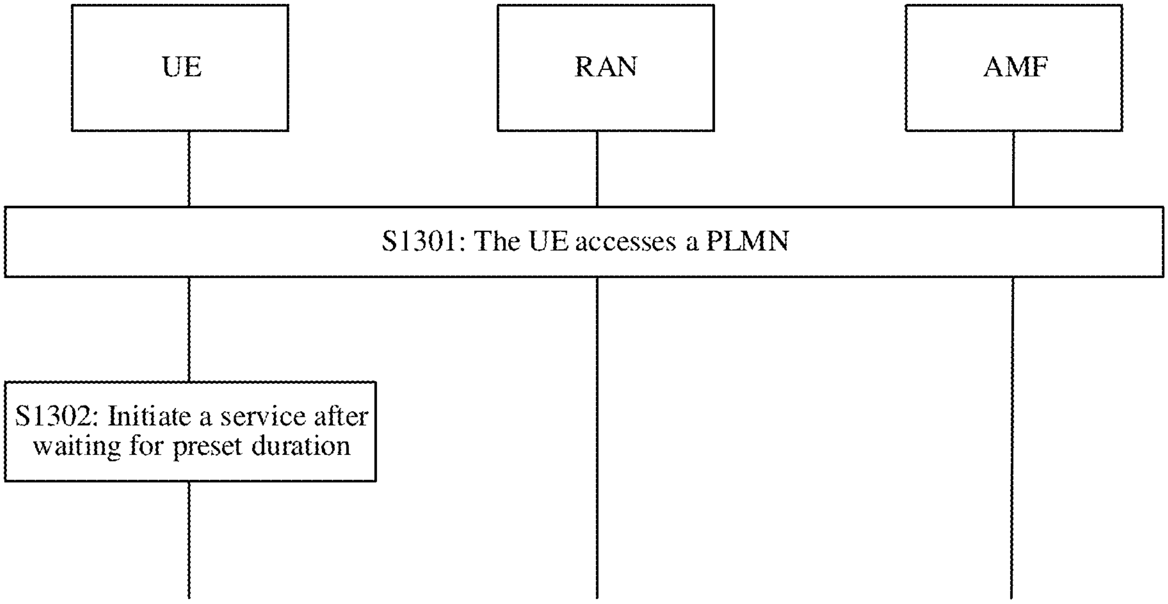
FIG. 13 shows a method for controlling UE to access a PLMN according to an embodiment of this application.

Based on the embodiment shown in FIG. 7, FIG. 13 shows a method for controlling UE to access a PLMN according to this application. In this method, the UE determines to access a network through a satellite, and initiates a service after waiting for preset duration. The method includes the following steps.

S1301: The UE accesses the PLMN.

Specifically, the UE sends a registration request message to an AMF and receives a registration accept message from the AMF. For that the UE sends the registration request message to the AMF, refer to descriptions in S601 and S602. Details are not described herein again.

In some embodiments, the UE accesses the PLMN through the satellite.

S1302: The UE initiates the service after waiting for the preset duration.

In some embodiments, the preset duration is greater than duration for a core network to verify whether the UE is allowed to access the PLMN.

For example, if the UE determines that the terminal accesses the PLMN through the satellite, the terminal initiates the service after waiting for the preset duration. The initiating the service may include initiating a session establishment process, initiating data transmission via a user plane, or initiating data transmission via a signaling plane. The initiating the session establishment process may specifically include that the UE sends a session establishment request to the AMF.

The preset duration may be provided by the AMF in the PLMN for the UE (for example, provided by the AMF to the UE during registration) and may also be locally configured by the UE.

Figure 14:
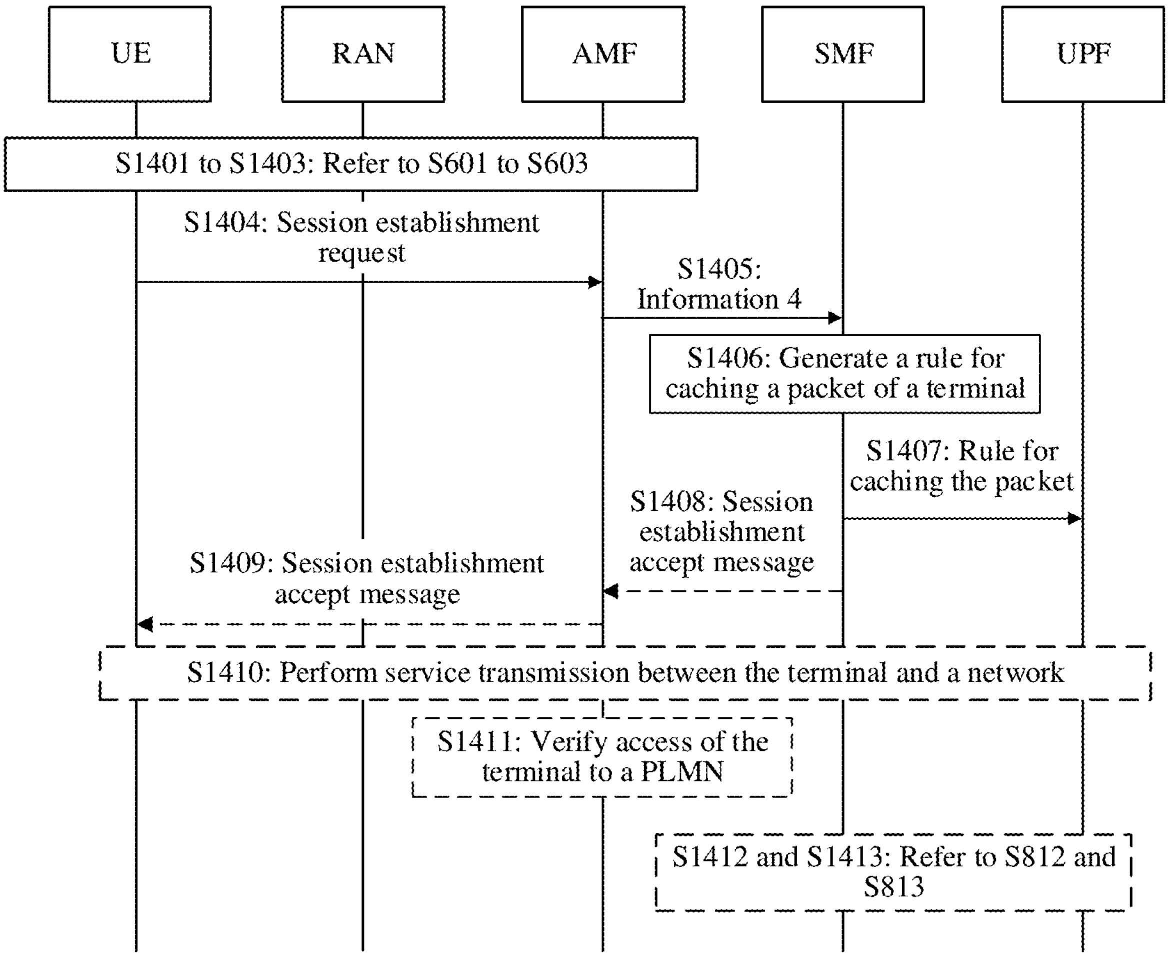
FIG. 14 shows a method for controlling UE to access a PLMN according to an embodiment of this application.

Based on the embodiment shown in FIG. 8, FIG. 14 shows a method for controlling UE to access a PLMN according to this application. In the method, that the terminal is the UE, a mobility management network element is an AMF, a session management network element is an SMF, and a user plane network element is a UPF is used as an example, and the method includes the following steps.

For S1401 to S1403, refer to S601 to S603. Details are not described herein again.

S1404: The UE sends a session establishment request to the AMF.

Specifically, the session establishment request is carried in a NAS message sent by the UE to the AMF.

S1405: When the AMF does not determine whether the terminal is allowed to access the PLMN, the AMF sends information 4 to the SMF.

For example, when determining that the UE accesses the network through a satellite, the AMF sends the information 4 to the SMF. Alternatively, the AMF sends the information 4 to the SMF when determining that the UE accesses the network through a satellite and has not verified that the UE accesses the PLMN. The information 4 may be included in an N11 message sent by the AMF to the SMF. In other words, the AMF sends the information 4 to the SMF when determining that the UE accesses the network through the satellite and does not obtain positioning information of the UE.

For specific descriptions of the information 4, refer to S805.

In some embodiments, the N11 message includes a timer 3 or a timer 4. For specific descriptions of the timer 3 or the timer 4, refer to S805. Alternatively, the timer 3 or the timer 4 is locally configured on the SMF.

S1406: The SMF generates, based on the information 4, a rule for caching a packet of the UE.

The rule may be an N4 rule. In some embodiments, the rule includes the timer 3 or the timer 4. In other words, the timer 3 or the timer 4 is maintained by the UPF.

It should be noted that, the timer 3 or the timer 4 may alternatively be maintained by the SMF, that is, the timer 3 or the timer 4 does not need to be included in the rule.

S1407: The SMF sends the rule for caching the packet of the terminal to the UPF.

In some embodiments, the rule includes the timer 3 or the timer 4.

S1408: The SMF sends a session establishment accept message to the AMF.

The session establishment accept message may be included in an N11 response message sent by the SMF to the AMF.

S1409: The AMF sends the session establishment accept message to the UE.

S1410: Data transmission is performed between UE or networks.

For example, the UE initiates transmission of an uplink packet, and the uplink packet is sent by the UE to the UPF via a RAN. Alternatively, a network side initiates transmission of a downlink packet, and the downlink packet is sent to the UPF.

The UPF caches the uplink packet or the downlink packet based on the rule received in a step.

For S1411, refer to S605. Details are not described herein again.

For S1412 and S1413, refer to S812 and S813. Details are not described herein again.

It should be understood that the examples in FIG. 6 to FIG. 14 in embodiments of this application are merely intended to help a person skilled in the art understand embodiments of this application, and are not intended to limit embodiments of this application to the specific scenarios shown in the examples. It is clear that a person skilled in the art can make various modifications or changes based on the examples in FIG. 6 to FIG. 14, and such modifications or changes also fall within the scope of embodiments of this application.

It should be further understood that examples in FIG. 6 to FIG. 14 in embodiments of this application are merely examples for description, and an execution sequence is not limited in the schematic diagrams. A person skilled in the art may flexibly adjust a sequence of the steps based on the examples in the figures. In addition, the sequence numbers of the foregoing processes do not mean an execution sequence, and the execution sequence of the processes should be determined based on functions and internal logic of the processes.

It should be further understood that the solutions in embodiments of this application may be used in combination, or may be used separately. In addition, explanations or descriptions of terms in embodiments may be mutually referred to or explained in the embodiments. This is not limited.

The foregoing describes a terminal positioning method provided in embodiments of this application, and the following describes an apparatus provided in embodiments of this application. It should be understood that the technical features described in the method embodiments are also applicable to the following apparatus embodiments.

Figure 15:
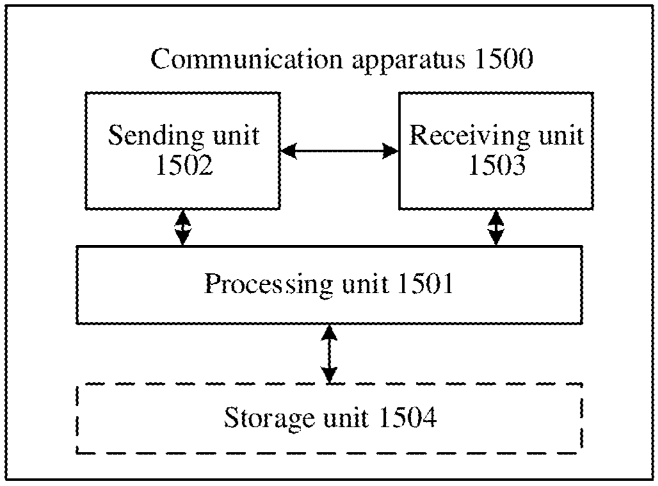
FIG. 15 is a schematic diagram of a communication apparatus 1500 according to an embodiment of this application.

FIG. 15 is a schematic diagram of a structure of a communication apparatus 1500 according to an embodiment of this application. The communication apparatus 1500 includes a processing unit 1501, a sending unit 1502, and a receiving unit 1503, and In some embodiments, further includes a storage unit 1504. The sending unit 1502 and the receiving unit 1503 may be a same unit, for example, a communication unit.

The processing unit 1501 is configured to control an action of the foregoing network elements, for example, support the foregoing network elements in performing the methods and the steps provided in embodiments of this application. The sending unit 1502 is configured to support the foregoing network elements in sending information to another network entity. For example, in embodiments of this application, the foregoing network elements send information to another network entity. The receiving unit 1503 is configured to support the foregoing network elements in receiving information sent by another network entity. For example, in embodiments of this application, the foregoing network elements receive information sent by another network entity. The storage unit 1504 is configured to store data and code of the foregoing network elements.

Specifically, the communication apparatus 1500 may be any network element in this application, and may implement functions that can be implemented by the network element. It should be understood that the communication apparatus 1500 may be a physical device, may be a component (for example, an integrated circuit or s chip) of a physical device, or may be a functional unit in a physical device.

In an example, the communication apparatus 1500 may be configured to implement a function of the mobility management network element described in this application. For example, the communication apparatus 1500 may be a mobility management network element, or may be a component (for example, an integrated circuit or s chip) in the mobility management network element, or may be a functional unit.

Specifically, the receiving unit 1503 is configured to receive identification information of a network from an access network device; and the sending unit 1502 is configured to: when it is not determined whether the terminal device is allowed to access the network, send, to the terminal device, information indicating not to initiate a service.

It should be understood that the communication apparatus 1500 provided in this embodiment of this application may be corresponding to the method related to the mobility management network element in the foregoing method embodiments, and units in the communication apparatus 1500 and the foregoing other operations and/or functions are separately used to implement corresponding steps of the mobility management network element in the foregoing method embodiments. Therefore, beneficial effects in the foregoing method embodiments may also be implemented. For brevity, details are not described herein again.

In an example, the communication apparatus 1500 may be configured to implement a function of the terminal device described in this specification. For example, the communication apparatus 1500 may be a terminal device, or may be a component (for example, an integrated circuit or a chip) in the terminal device, or may be a functional unit.

In some embodiments, the terminal device may further include a power supply, configured to provide power for various components or circuits in the terminal device.

In addition, to make functions of the terminal device more perfect, the terminal device may further include one or more of an input unit, a display unit, an audio circuit, a camera, a sensor, and the like. The audio circuit may further include a loudspeaker, a microphone 4, and the like.

Specifically, the sending unit 1502 is configured to send identification information of the network to a mobility management network element of the network; and the receiving unit 1503 is configured to receive, from the mobility management network element, information indicating not to initiate a service.

It should be understood that the communication apparatus 1500 provided in this embodiment of this application may be corresponding to the method related to the terminal device in the foregoing method embodiments, and units in the communication apparatus 1500 and the foregoing other operations and/or functions are separately used to implement corresponding steps of the terminal device in the foregoing method embodiments. Therefore, beneficial effects in the foregoing method embodiments may also be implemented. For brevity, details are not described herein again.

It should also be understood that in this embodiment, the communication apparatus 1500 is presented in a form of a functional unit. The "unit" herein may be an application-specific integrated circuit ASIC, a circuit, a processor and a memory that execute one or more software or firmware programs, an integrated logic circuit, and/or another component that can provide the foregoing functions.

In an example, a person skilled in the art may figure out that the communication apparatus 1500 may be in a form shown in FIG. 5. The processing module 1501 may be implemented by using the processor 501 shown in FIG. 5. In some embodiments, if the communication apparatus shown in FIG. 5 includes the memory 503, the processing module 1501 may be implemented by using the processor 501 and the memory 503. Specifically, the processor 501 is implemented by executing a computer program stored in the memory 503. The receiving module 1502 and the sending module 1503 may be implemented by using the communication line 502 and the communication interface 504 shown in FIG. 5.

In some embodiments, when the communication apparatus 1500 is a chip, functions and/or implementation processes of the receiving module 1502 and the sending module 1503 may also be implemented by using a pin, a circuit, or the like. Alternatively, the storage unit may be a storage unit in the chip of the communication apparatus 1500, for example, a register or a cache. Alternatively, the storage unit may be a storage unit that is in the communication apparatus 1500 and that is located outside the chip, or may be a storage unit deployed in another system or device, and is not in the communication apparatus.

All or a part of the foregoing embodiments may be implemented by software, hardware, firmware, or any combination thereof. When a software program is used to implement the embodiments, all or a part of the embodiments may be implemented in a form of a computer program product. The computer program product includes one or more computer instructions. When the computer program instructions are loaded and executed on a computer, the processes or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DSL)) or wireless (for example, infrared, radio, and microwave) manner. The computer-readable storage medium may be any usable medium accessible by a computer, or a data storage device integrating one or more usable media, for example, a server or a data center. The usable medium may be a magnetic medium (for example, a floppy disk, a hard disk, or a magnetic tape), an optical medium (for example, a DVD), a semiconductor medium (for example, a solid-state disk (Solid State Disk, SSD)), or the like.

Although this application is described with reference to embodiments, in a process of implementing this application that claims protection, a person skilled in the art may understand and implement another variation of the disclosed embodiments by viewing the accompanying drawings, disclosed content, and appended claims. In the claims, the term "comprise" (comprising) does not exclude another component or another step, and "a" or "one" does not exclude a case of plurality. A single processor or another unit may implement several functions enumerated in the claims. Some measures are recorded in dependent claims that are different from each other, but this does not indicate that these measures cannot be combined to produce a better effect.

Although this application is described with reference to specific features and embodiments thereof, it is clear that various modifications and combinations may be made to them without departing from the protection scope of this application. Correspondingly, the specification and the accompanying drawings are merely example descriptions of this application defined by the following claims, and are deemed to have covered any and all modifications, variations, combinations, or equivalents that fall within the scope of this application. It is clear that a person skilled in the art can make various modifications and variations to this application without departing from the scope of this application. In this way, this application is intended to cover these modifications and variations of this application provided that they fall within the scope of the claims of this application and their equivalent technologies.

What is claimed is:

1. A method for controlling a terminal device to access a network, comprising:

receiving identification information of the network from an access network device; and sending to the terminal device, information indicating not to initiate a service in response to failing to determine whether the terminal device is allowed to access the network, wherein a precision of a location of the terminal device is insufficient to determine whether to allow the terminal device to access the network;

wherein sending, to the terminal device, the information indicating not to initiate the service further comprises:

sending a first message to the terminal device, wherein the first message comprises a timer 2, the timer 2 is used to instruct the terminal device not to initiate a service with a duration of the timer 2.

2. The method according to claim 1, further comprising:

determining that the terminal device accesses the network through a satellite.

3. The method according to claim 1, wherein the first message is a registration accept message or a response message of a session establishment request.

4. The method according to claim 1, wherein the information indicating not to initiate the service is useable to indicate whether the terminal device is allowed to access the network fails to be verified.

5. The method according to claim 1, wherein the first message further comprises a timer 1, and the timer 1 is useable to indicate that deregistration is initiated after the timer 1 expires.

6. A method for controlling a terminal device to access a network, comprising:

sending identification information of the network to a mobility management network element of the network; and receiving information, from the mobility management network element, indicating not to initiate a service, in response to the mobility management network element failing to determine whether the terminal device is allowed to access the network, wherein a precision of a location of the terminal device is insufficient to determine whether to allow the terminal device to access the network;

wherein receiving the information, from the mobility management network element, indicating not to initiate the service further comprises:

receiving a first message from the mobility management network element, wherein the first message comprises a timer 2, the timer 2 is used to instruct the terminal device not to initiate a service with a duration of the timer 2.

7. The method according to claim 6, wherein the first message is a registration accept message or a response message of a session establishment request.

8. The method according to claim 6, wherein the information indicating not to initiate the service is useable to indicate whether the terminal device is allowed to access the network fails to be verified.

9. The method according to claim 6, wherein the first message further comprises a timer 1, and the timer 1 is useable to indicate that deregistration is initiated after the timer 1 expires.

10. A communication apparatus, comprising at least one processor coupled to at least one memory, the at least one memory configured to store non-transitory instructions, and the at least one processor configured to execute the non-transitory instructions thereby causing the apparatus to:

send identification information of the network to a mobility management network element of the network; and receive, from the mobility management network element, information indicating not to initiate a service, in response to the mobility management network element failing to determine whether the apparatus is allowed to access the network, wherein a precision of a location of the apparatus is insufficient to determine whether to allow the apparatus to access the network;

wherein receive, from the mobility management network element, the information indicating not to initiate the service further causing the apparatus to:

receive a first message from the mobility management network element, wherein the first message comprises a timer 2, the timer 2 is used to instruct the terminal device not to initiate a service with a duration of the timer 2.

11. The communication apparatus according to claim 10, wherein the first message is a registration accept message or a response message of a session establishment request.

12. The communication apparatus according to claim 10, wherein the information indicating not to initiate the service is useable to indicate whether the communication apparatus is allowed to access the network fails to be verified.

13. The communication apparatus according to claim 10, wherein the first message further comprises a timer 1, and the timer 1 is useable to indicate that deregistration is initiated after the timer 1 expires.

* * * * *